US012640782B2

(12) United States Patent
Lee et al.

(10) Patent No.: US 12,640,782 B2
(45) Date of Patent: May 26, 2026

(54) FREQUENCY-SELECTIVE UPLINK PRECODING

(71) Applicant: QUALCOMM Incorporated, San Diego, CA (US)

(72) Inventors: Hyojin Lee, San Diego, CA (US); Yu Zhang, San Diego, CA (US); Yi Huang, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/572,684

(22) PCT Filed: Aug. 27, 2021

(86) PCT No.: PCT/CN2021/114958
§ 371 (c)(1),
(2) Date: Dec. 20, 2023

(87) PCT Pub. No.: WO2023/024061
PCT Pub. Date: Mar. 2, 2023

(65) Prior Publication Data
US 2024/0291529 A1 Aug. 29, 2024

(51) Int. Cl.
*H04B 7/0456* (2017.01)
*H04L 5/00* (2006.01)

(52) U.S. Cl.
CPC ......... *H04B 7/0456* (2013.01); *H04L 5/0053* (2013.01)

(58) Field of Classification Search
CPC .. H04B 7/0456; H04B 7/0639; H04B 7/0417; H04B 7/0452; H04B 7/0621; H04L 5/0053
See application file for complete search history.

(56) References Cited

U.S. PATENT DOCUMENTS 11,785,594 B2 * 10/2023 Khoshnevisan ........ H04L 1/189
370/329
2017/0311296 A1 * 10/2017 Onggosanusi ....... H04B 7/0456
(Continued)

OTHER PUBLICATIONS

International Search Report and Written Opinion—PCT/CN2021/114958—ISA/EPO—Feb. 28, 2022 (2106067WO1).
(Continued)

*Primary Examiner* — Rasheed Gidado
(74) *Attorney, Agent, or Firm* — Holland & Hart LLP

(57) ABSTRACT
Methods, systems, and devices for wireless communication are described. In some systems, a base station may transmit subband uplink precoding information to a user equipment (UE). The base station may transmit a first control message to the UE to indicate a set of downlink resources for a downlink message associated with the subband uplink precoding information for the UE. The base station may transmit a second control message to the UE to indicate a set of uplink resources for an uplink message. The base station may transmit the downlink message to the UE via the set of downlink resources indicated by the first control message. The downlink message, the second control message, or both may include the subband uplink precoding information for the UE. The UE may transmit an uplink message to the base station via the set of uplink resources using the subband uplink precoding information.

26 Claims, 20 Drawing Sheets

(56) References Cited

U.S. PATENT DOCUMENTS

| | | | | |
|---|---|---|---|---|
| 2017/0359834 A1* | 12/2017 | Wang | ................ | H04W 72/1273 |
| 2018/0287682 A1* | 10/2018 | Kwak | .................. | H04B 7/0695 |
| 2021/0274521 A1* | 9/2021 | Yuan | .................... | H04L 1/0038 |
| 2021/0378007 A1* | 12/2021 | You | ........................ | H04L 1/1854 |

OTHER PUBLICATIONS

Zte, et al., "Remaining Details on Codebook Based UL Transmission", 3GPP Draft; R1- 1719527, Remaining Details on Codebook Based UL Transmission, 3rd Generation Partnership Project (3GPP), Mobile Competence Centre, 650, Route Des Lucioles, F-06921 Sophia-Antipolis Ced, vol. RAN WG1, No. Reno, USA, Nov. 27-Dec. 1, 2017, Nov. 18, 2017 (Nov. 18, 2017); XP051369341, pp. 1-5, Section 1, 2.1, the whole document.

* cited by examiner 115-e 105-b

705

First Control Message Indicating Downlink Resources

710

Second Control Message Indicating Uplink Resources

715

Downlink Message

720

Uplink Message

700

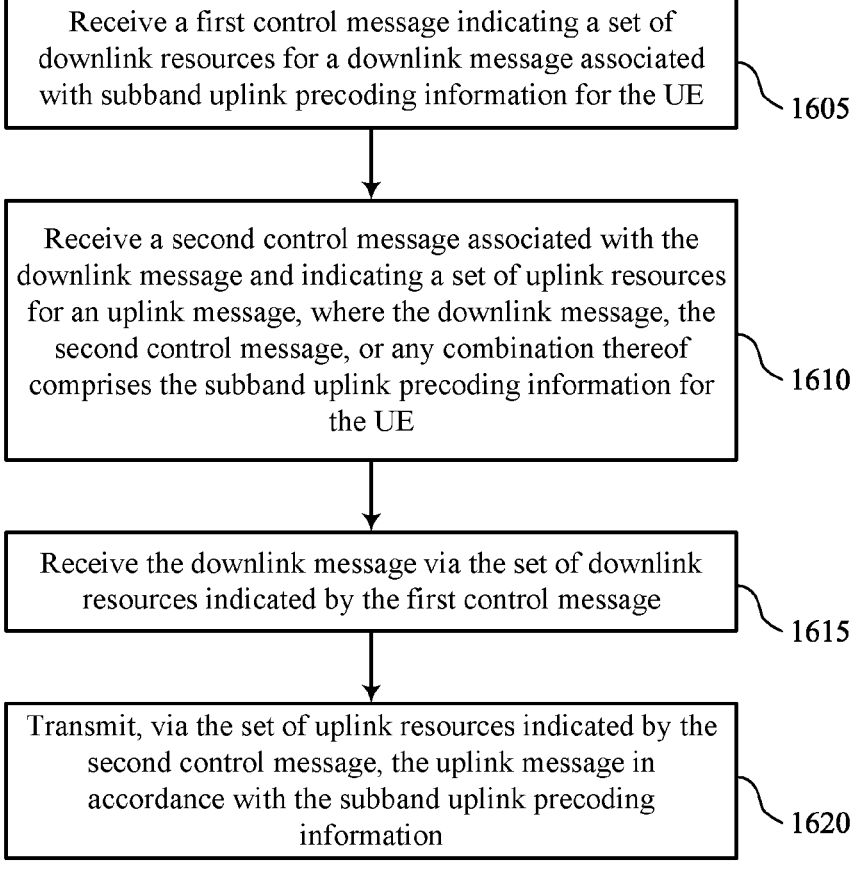

Receive a first control message indicating a set of downlink resources for a downlink message associated with subband uplink precoding information for the UE

1605

Receive a second control message associated with the downlink message and indicating a set of uplink resources for an uplink message, where the downlink message, the second control message, or any combination thereof comprises the subband uplink precoding information for the UE

1610

Receive the downlink message via the set of downlink resources indicated by the first control message

1615

Transmit, via the set of uplink resources indicated by the second control message, the uplink message in accordance with the subband uplink precoding information

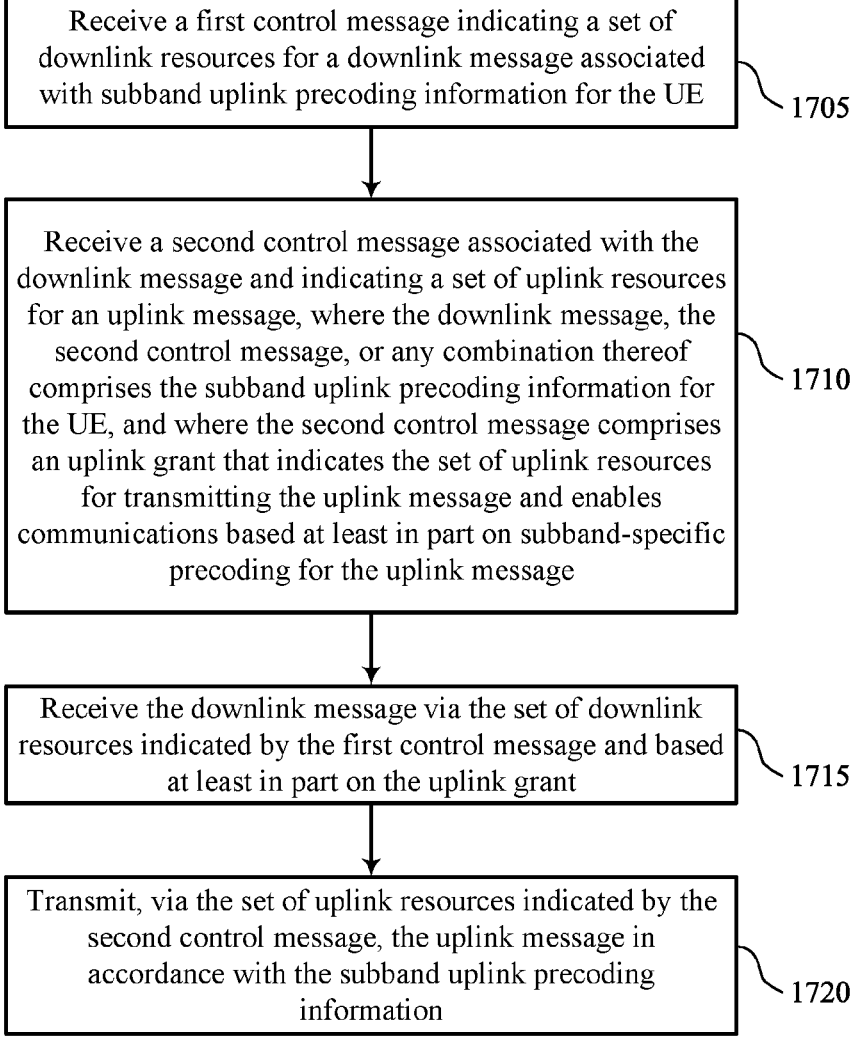

Receive a first control message indicating a set of downlink resources for a downlink message associated with subband uplink precoding information for the UE

1705

Receive a second control message associated with the downlink message and indicating a set of uplink resources for an uplink message, where the downlink message, the second control message, or any combination thereof comprises the subband uplink precoding information for the UE, and where the second control message comprises an uplink grant that indicates the set of uplink resources for transmitting the uplink message and enables communications based at least in part on subband-specific precoding for the uplink message

1710

Receive the downlink message via the set of downlink resources indicated by the first control message and based at least in part on the uplink grant

1715

Transmit, via the set of uplink resources indicated by the second control message, the uplink message in accordance with the subband uplink precoding information

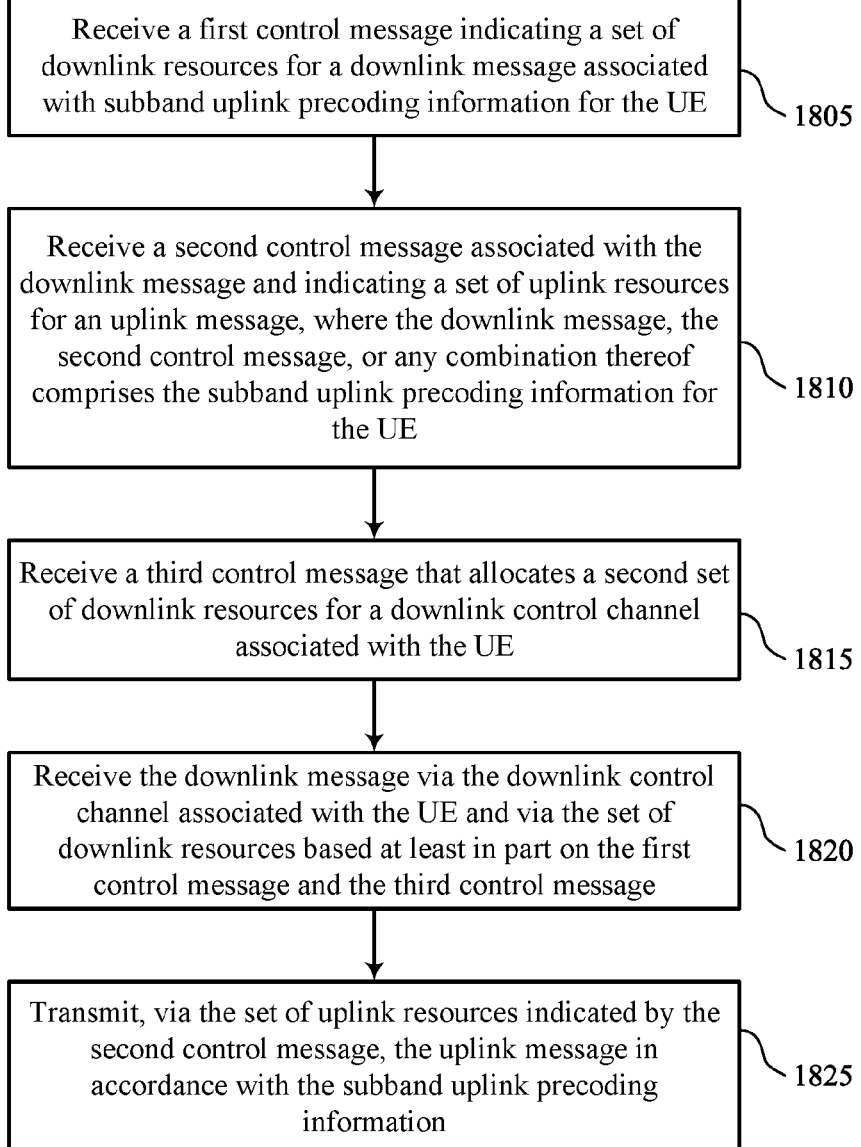

Receive a first control message indicating a set of downlink resources for a downlink message associated with subband uplink precoding information for the UE — 1805

Receive a second control message associated with the downlink message and indicating a set of uplink resources for an uplink message, where the downlink message, the second control message, or any combination thereof comprises the subband uplink precoding information for the UE — 1810

Receive a third control message that allocates a second set of downlink resources for a downlink control channel associated with the UE — 1815

Receive the downlink message via the downlink control channel associated with the UE and via the set of downlink resources based at least in part on the first control message and the third control message — 1820

Transmit, via the set of uplink resources indicated by the second control message, the uplink message in accordance with the subband uplink precoding information — 1825

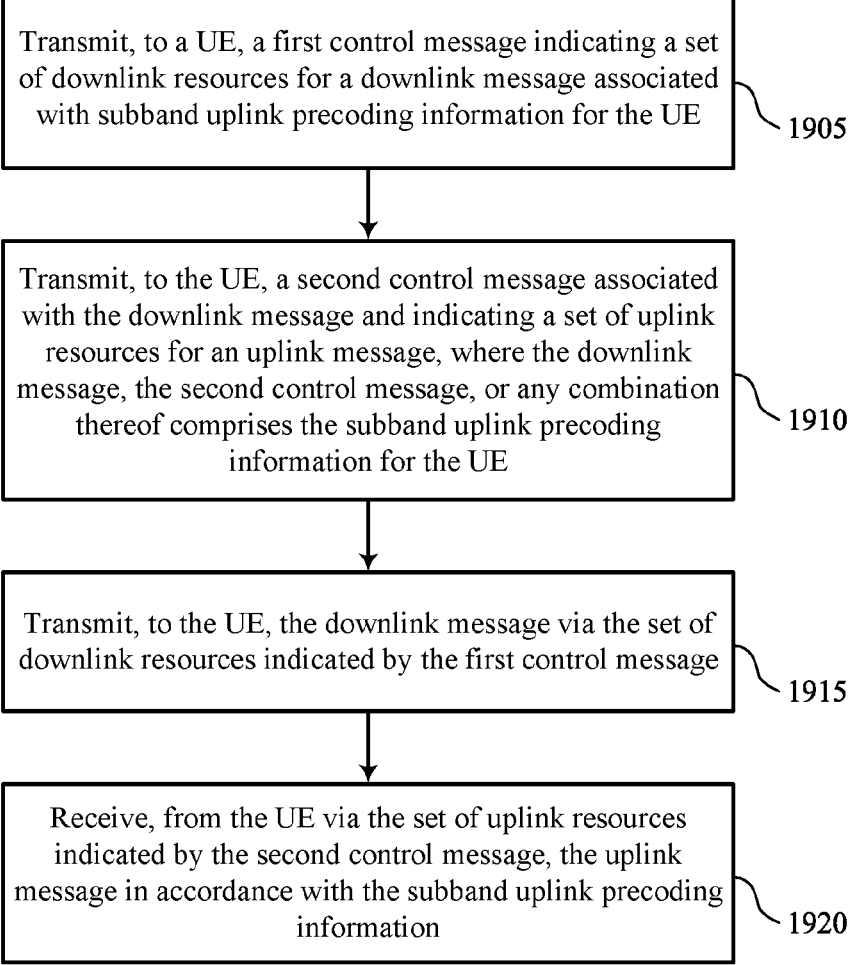

Transmit, to a UE, a first control message indicating a set of downlink resources for a downlink message associated with subband uplink precoding information for the UE

1905

Transmit, to the UE, a second control message associated with the downlink message and indicating a set of uplink resources for an uplink message, where the downlink message, the second control message, or any combination thereof comprises the subband uplink precoding information for the UE

1910

Transmit, to the UE, the downlink message via the set of downlink resources indicated by the first control message

1915

Receive, from the UE via the set of uplink resources indicated by the second control message, the uplink message in accordance with the subband uplink precoding information

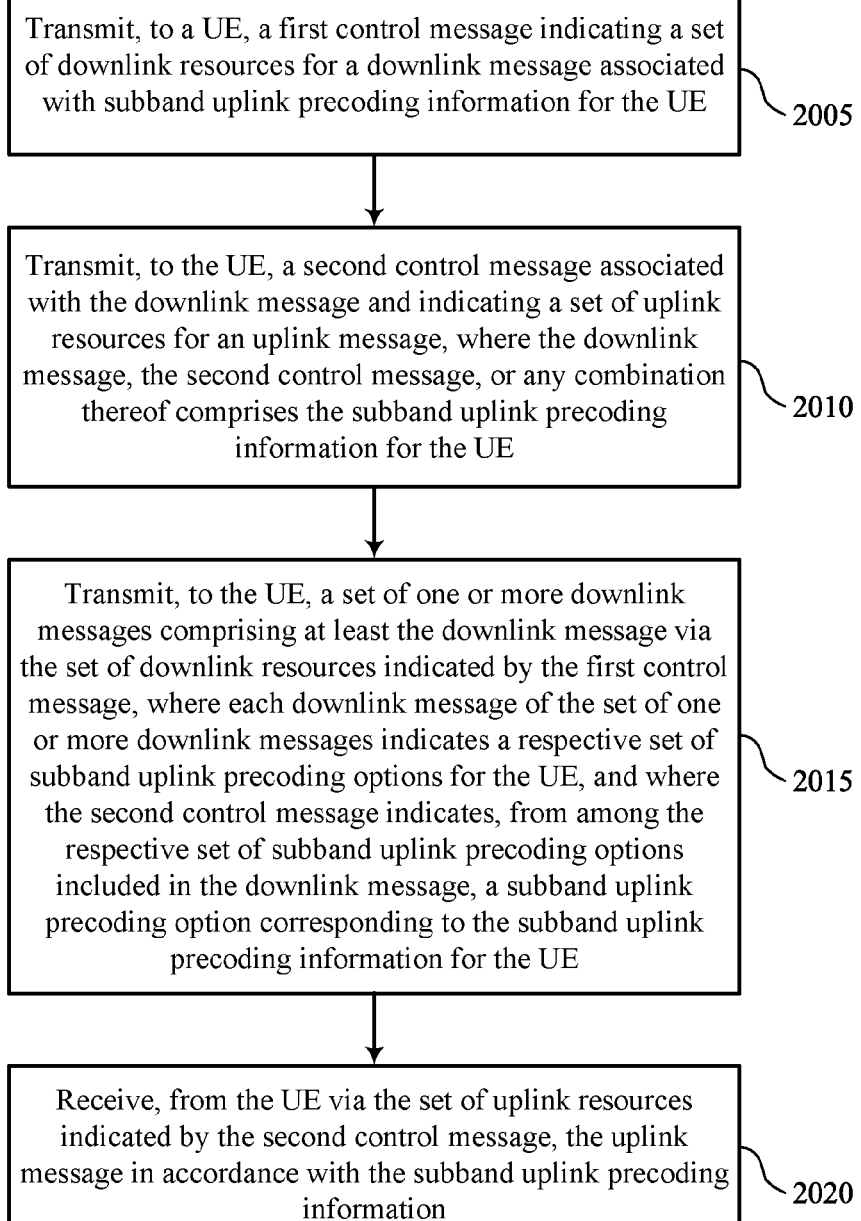

Transmit, to a UE, a first control message indicating a set of downlink resources for a downlink message associated with subband uplink precoding information for the UE

2005

Transmit, to the UE, a second control message associated with the downlink message and indicating a set of uplink resources for an uplink message, where the downlink message, the second control message, or any combination thereof comprises the subband uplink precoding information for the UE

2010

Transmit, to the UE, a set of one or more downlink messages comprising at least the downlink message via the set of downlink resources indicated by the first control message, where each downlink message of the set of one or more downlink messages indicates a respective set of subband uplink precoding options for the UE, and where the second control message indicates, from among the respective set of subband uplink precoding options included in the downlink message, a subband uplink precoding option corresponding to the subband uplink precoding information for the UE

2015

Receive, from the UE via the set of uplink resources indicated by the second control message, the uplink message in accordance with the subband uplink precoding information

FREQUENCY-SELECTIVE UPLINK PRECODING

CROSS REFERENCE

The present application is a 371 national stage filing of International PCT Application No. PCT/CN2021/114958 by LEE et al. entitled "FREQUENCY-SELECTIVE UPLINK PRECODING," filed Aug. 27, 2021, which is assigned to the assignee hereof, and which is expressly incorporated by reference in its entirety herein.

FIELD OF TECHNOLOGY

The following relates to wireless communication, including frequency-selective uplink precoding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communications between a UE and a base station may be precoded, which may support beam alignment between the devices and reduce interference with other communications. A base station may transmit a wideband (e.g., non-subband specific) precoding matrix indicator (PMI) to a UE to indicate an uplink precoder for the UE to use for uplink communications. The base station may indicate the wideband PMI via a field in downlink control information (DCI), and a value of the field may correspond to an uplink precoding matrix from a codebook supported by the UE. The UE may use the uplink precoding matrix to transmit a subsequent uplink transmission to the base station.

SUMMARY

The described techniques relate to improved methods, systems, devices, and apparatuses that support frequency-selective uplink precoding. Generally, the described techniques provide for a base station to transmit subband uplink precoding information (which may include subband-specific precoding information for multiple different subbands, and which may alternatively be referred to as frequency-selective uplink precoding information) to a user equipment (UE). The base station may transmit a first control message to the UE to indicate a set of downlink resources for a downlink message associated with the subband uplink precoding information and a second control message to the UE to indicate a set of uplink resources for an uplink message to be transmitted by the UE. The base station may additionally transmit the downlink message to the UE via the set of downlink resources indicated by the first control message. The downlink message, the second control message, or both, may include the subband uplink precoding information for the UE.

In some examples, the downlink message may be transmitted via a medium access control-control element (MAC-CE), a physical downlink shared channel (PDSCH), a control channel configured for channel state information (CSI) reporting, or any combination thereof, and the second control message may include an uplink grant that indicates or schedules the downlink message. Additionally or alternatively, the downlink message may include a PDSCH transmission and the second control message may be a MAC-CE including an uplink grant that is associated with the PDSCH transmission. In such cases, the uplink grant may indicate the subband uplink precoding information. The UE may transmit the uplink message to the base station via the set of uplink resources indicated by the second control message using the indicated subband uplink precoding information.

A method for wireless communication at a UE is described. The method may include receiving a first control message indicating a set of downlink resources for a downlink message associated with subband uplink precoding information for the UE, receiving a second control message associated with the downlink message and indicating a set of uplink resources for an uplink message, where the downlink message, the second control message, or any combination thereof includes the subband uplink precoding information for the UE, receiving the downlink message via the set of downlink resources indicated by the first control message, and transmitting, via the set of uplink resources indicated by the second control message, the uplink message in accordance with the subband uplink precoding information.

An apparatus for wireless communication at a UE is described. The apparatus may include a processor, memory in electronic communication with the processor, and instructions stored in the memory. The instructions may be executable by the processor to receive a first control message indicating a set of downlink resources for a downlink message associated with subband uplink precoding information for the UE, receive a second control message associated with the downlink message and indicating a set of uplink resources for an uplink message, where the downlink message, the second control message, or any combination thereof includes the subband uplink precoding information for the UE, receive the downlink message via the set of downlink resources indicated by the first control message, and transmit, via the set of uplink resources indicated by the second control message, the uplink message in accordance with the subband uplink precoding information.

Another apparatus for wireless communication at a UE is described. The apparatus may include means for receiving a first control message indicating a set of downlink resources for a downlink message associated with subband uplink precoding information for the UE, means for receiving a second control message associated with the downlink message and indicating a set of uplink resources for an uplink message, where the downlink message, the second control message, or any combination thereof includes the subband uplink precoding information for the UE, means for receiving the downlink message via the set of downlink resources indicated by the first control message, and means for transmitting, via the set of uplink resources indicated by the second control message, the uplink message in accordance with the subband uplink precoding information.

A non-transitory computer-readable medium storing code for wireless communication at a UE is described. The code may include instructions executable to receive a first control message indicating a set of downlink resources for a downlink message associated with subband uplink precoding information for the UE, receive a second control message associated with the downlink message and indicating a set of uplink resources for an uplink message, where the downlink message, the second control message, or any combination thereof includes the subband uplink precoding information for the UE, receive the downlink message via the set of downlink resources indicated by the first control message, and transmit, via the set of uplink resources indicated by the second control message, the uplink message in accordance with the subband uplink precoding information.

Some examples of the method, apparatuses, and non-transitory computer-readable medium described herein may further include operations, features, means, or instructions for receiving a set of one or more downlink messages including at least the downlink message, where each downlink message of the set of one or more downlink messages may indicate a respective set of subband uplink precoding options for the UE, and the second control message may indicate, from among the respective set of subband uplink precoding options included in the downlink message, a subband uplink precoding option corresponding to the subband uplink precoding information for the UE.

In some examples of the method, apparatuses, and non-transitory computer-readable medium described herein, each subband uplink precoding option of the respective set of subband uplink precoding options included in the downlink message may correspond to a different single-user or multi-user pairing scenario for the UE.

In some examples of the method, apparatuses, and non-transitory computer-readable medium described herein, the first control message may indicate a maximum quantity of subband uplink precoding options for each respective set of subband uplink precoding options, one or more sets of downlink resources for receiving the set of one or more downlink messages, a codebook type for the subband uplink precoding information, a codebook mode for the subband uplink precoding information, or any combination thereof.

In some examples of the method, apparatuses, and non-transitory computer-readable medium described herein, each subband uplink precoding option of the respective set of subband uplink precoding options included in the downlink message may include respective subband precoding matrix indicator (PMI) information and respective rank indicator (RI) information for the UE or for a set of UEs that includes the UE.

Some examples of the method, apparatuses, and non-transitory computer-readable medium described herein may further include operations, features, means, or instructions for receiving radio resource control (RRC) signaling indicating a periodicity associated with the set of one or more downlink messages, where the RRC signaling may include the first control message and receiving the set of one or more downlink messages in accordance with the periodicity.

Some examples of the method, apparatuses, and non-transitory computer-readable medium described herein may further include operations, features, means, or instructions for receiving downlink control information (DCI) that schedules each downlink message of the set of one or more downlink messages and receiving the set of one or more downlink messages in an aperiodic or semi-persistent manner in accordance with the DCI.

In some examples of the method, apparatuses, and non-transitory computer-readable medium described herein, the second control message may include a field for which a first set of values each correspond to a different wideband uplink precoding option for the UE and a second set of values each correspond to a different subband uplink precoding option of the respective set of subband uplink precoding options and to indicate the subband uplink precoding option from among the respective set of subband uplink precoding options included in the downlink message, the field may have a value that may be included in the second set of values and may correspond to the subband uplink precoding option.

In some examples of the method, apparatuses, and non-transitory computer-readable medium described herein, the second control message may include a first indication of a value and a second indication of whether the value corresponds to a respective wideband uplink precoding option for the UE or corresponds to a respective subband uplink precoding option of the respective set of subband uplink precoding options and to indicate the subband uplink precoding option from among the respective set of subband uplink precoding options included in the downlink message, the second indication may indicate that the value of the first indication corresponds to a respective subband uplink precoding option of the respective set of subband uplink precoding options, and the value of the first indication corresponds to the subband uplink precoding option.

In some examples of the method, apparatuses, and non-transitory computer-readable medium described herein, the second control message may include a first field for which a first set of values each correspond to a different wideband uplink precoding option for the UE, a second field for which a second set of values each correspond to a different subband uplink precoding option of the respective set of subband uplink precoding options, and a third field that indicates whether the UE may be to use wideband uplink precoding based on the first field or the UE may be to use subband uplink precoding based on the second field and to indicate the subband uplink precoding option from among the respective set of subband uplink precoding options included in the downlink message, the third field may indicate that the UE may be to use subband uplink precoding, and the second field may have a value that may be included in the second set of values and corresponds to the subband uplink precoding option.

In some examples of the method, apparatuses, and non-transitory computer-readable medium described herein, receiving the second control message may include operations, features, means, or instructions for receiving an uplink grant that indicates the set of uplink resources for transmitting the uplink message.

In some examples of the method, apparatuses, and non-transitory computer-readable medium described herein, receiving the second control message may include operations, features, means, or instructions for receiving, via the second control message, an uplink grant that indicates the set of uplink resources for transmitting the uplink message and enables communications based on subband-specific precoding for the uplink message and receiving the downlink message based on the uplink grant.

Some examples of the method, apparatuses, and non-transitory computer-readable medium described herein may further include operations, features, means, or instructions for receiving a second uplink grant that disables communications based on the subband-specific precoding and indicates a second set of uplink resources for transmitting a second uplink message, the second uplink grant including wideband precoding information for the second uplink message and transmitting the second uplink message in accordance with the wideband precoding information and via the second set of uplink resources indicated by the second uplink grant.

In some examples of the method, apparatuses, and non-transitory computer-readable medium described herein, receiving the downlink message may include operations, features, means, or instructions for receiving the downlink message via a downlink shared channel.

Some examples of the method, apparatuses, and non-transitory computer-readable medium described herein may further include operations, features, means, or instructions for receiving a third control message that allocates a second set of downlink resources for a downlink control channel associated with the UE and receiving the downlink message via the downlink control channel associated with the UE based on the third control message.

In some examples of the method, apparatuses, and non-transitory computer-readable medium described herein, receiving the downlink message may include operations, features, means, or instructions for receiving a MAC-CE.

Some examples of the method, apparatuses, and non-transitory computer-readable medium described herein may further include operations, features, means, or instructions for transmitting an acknowledgment (ACK) message in response to receiving the MAC-CE, where the second control message includes an uplink grant that indicates the MAC-CE based on the MAC-CE being a most recent MAC-CE acknowledged by the UE.

In some examples of the method, apparatuses, and non-transitory computer-readable medium described herein, receiving the downlink message may include receiving a downlink shared channel transmission via the set of downlink resources, the first control message may include DCI that schedules the downlink shared channel transmission, and receiving the second control message may include receiving a MAC-CE associated with the downlink shared channel transmission, the MAC-CE including an uplink grant that indicates uplink resources for the uplink message and indicates the subband uplink precoding information for the UE.

A method for wireless communication at a base station is described. The method may include transmitting, to a UE, a first control message indicating a set of downlink resources for a downlink message associated with subband uplink precoding information for the UE, transmitting, to the UE, a second control message associated with the downlink message and indicating a set of uplink resources for an uplink message, where the downlink message, the second control message, or any combination thereof includes the subband uplink precoding information for the UE, transmitting, to the UE, the downlink message via the set of downlink resources indicated by the first control message, and receiving, from the UE via the set of uplink resources indicated by the second control message, the uplink message in accordance with the subband uplink precoding information.

An apparatus for wireless communication at a base station is described. The apparatus may include a processor, memory in electronic communication with the processor, and instructions stored in the memory. The instructions may be executable to transmit, to a UE, a first control message indicating a set of downlink resources for a downlink message associated with subband uplink precoding information for the UE, transmit, to the UE, a second control message associated with the downlink message and indicating a set of uplink resources for an uplink message, where the downlink message, the second control message, or any combination thereof includes the subband uplink precoding information for the UE, transmit, to the UE, the downlink message via the set of downlink resources indicated by the first control message, and receive, from the UE via the set of uplink resources indicated by the second control message, the uplink message in accordance with the subband uplink precoding information.

Another apparatus for wireless communication at a base station is described. The apparatus may include means for transmitting, to a UE, a first control message indicating a set of downlink resources for a downlink message associated with subband uplink precoding information for the UE, means for transmitting, to the UE, a second control message associated with the downlink message and indicating a set of uplink resources for an uplink message, where the downlink message, the second control message, or any combination thereof includes the subband uplink precoding information for the UE, means for transmitting, to the UE, the downlink message via the set of downlink resources indicated by the first control message, and means for receiving, from the UE via the set of uplink resources indicated by the second control message, the uplink message in accordance with the subband uplink precoding information.

A non-transitory computer-readable medium storing code for wireless communication at a base station is described. The code may include instructions executable to transmit, to a UE, a first control message indicating a set of downlink resources for a downlink message associated with subband uplink precoding information for the UE, transmit, to the UE, a second control message associated with the downlink message and indicating a set of uplink resources for an uplink message, where the downlink message, the second control message, or any combination thereof includes the subband uplink precoding information for the UE, transmit, to the UE, the downlink message via the set of downlink resources indicated by the first control message, and receive, from the UE via the set of uplink resources indicated by the second control message, the uplink message in accordance with the subband uplink precoding information.

Some examples of the method, apparatuses, and non-transitory computer-readable medium described herein may further include operations, features, means, or instructions for transmitting, to the UE, a set of one or more downlink messages including at least the downlink message, where each downlink message of the set of one or more downlink messages may indicate a respective set of subband uplink precoding options for the UE, and the second control message may indicate, from among the respective set of subband uplink precoding options included in the downlink message, a subband uplink precoding option corresponding to the subband uplink precoding information for the UE.

In some examples of the method, apparatuses, and non-transitory computer-readable medium described herein, each subband uplink precoding option of the respective set of subband uplink precoding options included in the downlink message may correspond to a different single-user or multi-user pairing scenario for the UE.

In some examples of the method, apparatuses, and non-transitory computer-readable medium described herein, the second control message may include a field for which a first set of values each correspond to a different wideband uplink precoding option for the UE and a second set of values each correspond to a different subband uplink precoding option of the respective set of subband uplink precoding options and to indicate the subband uplink precoding option from among the respective set of subband uplink precoding options included in the downlink message, the field may have a value that may be included in the second set of values and corresponds to the subband uplink precoding option.

In some examples of the method, apparatuses, and non-transitory computer-readable medium described herein, the second control message may include a first indication of a value and a second indication of whether the value corresponds to a respective wideband uplink precoding option for the UE or corresponds to a respective subband uplink precoding option of the respective set of subband uplink precoding options and to indicate the subband uplink precoding option from among the respective set of subband uplink precoding options included in the downlink message, the second indication may indicate that the value of the first indication corresponds to a respective subband uplink precoding option of the respective set of subband uplink precoding options, and the value of the first indication corresponds to the subband uplink precoding option.

In some examples of the method, apparatuses, and non-transitory computer-readable medium described herein, the second control message may include a first field for which a first set of values each correspond to a different wideband uplink precoding option for the UE, a second field for which a second set of values each correspond to a different subband uplink precoding option of the respective set of subband uplink precoding options, and a third field that indicates whether the UE may be to use wideband uplink precoding based on the first field or the UE may be to use subband uplink precoding based on the second field and to indicate the subband uplink precoding option from among the respective set of subband uplink precoding options included in the downlink message, the third field may indicate that the UE may be to use subband uplink precoding, and the second field may have a value that may be included in the second set of values and corresponds to the subband uplink precoding option.

Some examples of the method, apparatuses, and non-transitory computer-readable medium described herein may further include operations, features, means, or instructions for transmitting, to the UE, a MAC-CE, the MAC-CE including the downlink message, receiving, from the UE, an ACK message in response to the MAC-CE, and transmitting the second control message including an uplink grant that indicates the MAC-CE based on the MAC-CE being a most recent MAC-CE acknowledged by the UE.

Some examples of the method, apparatuses, and non-transitory computer-readable medium described herein may further include operations, features, means, or instructions for transmitting the downlink message includes transmitting a downlink shared channel transmission via the set of downlink resources, the first control message includes DCI that schedules the downlink shared channel transmission, and transmitting the second control message includes transmitting a MAC-CE associated with the downlink shared channel transmission, the MAC-CE including an uplink grant that indicates uplink resources for the uplink message and indicates the subband uplink precoding information for the UE.

BRIEF DESCRIPTION OF THE DRAWINGS

FIGS. 16 through 20 show flowcharts illustrating methods that support frequency-selective uplink precoding in accordance with aspects of the present disclosure.

DETAILED DESCRIPTION

Figure 1:
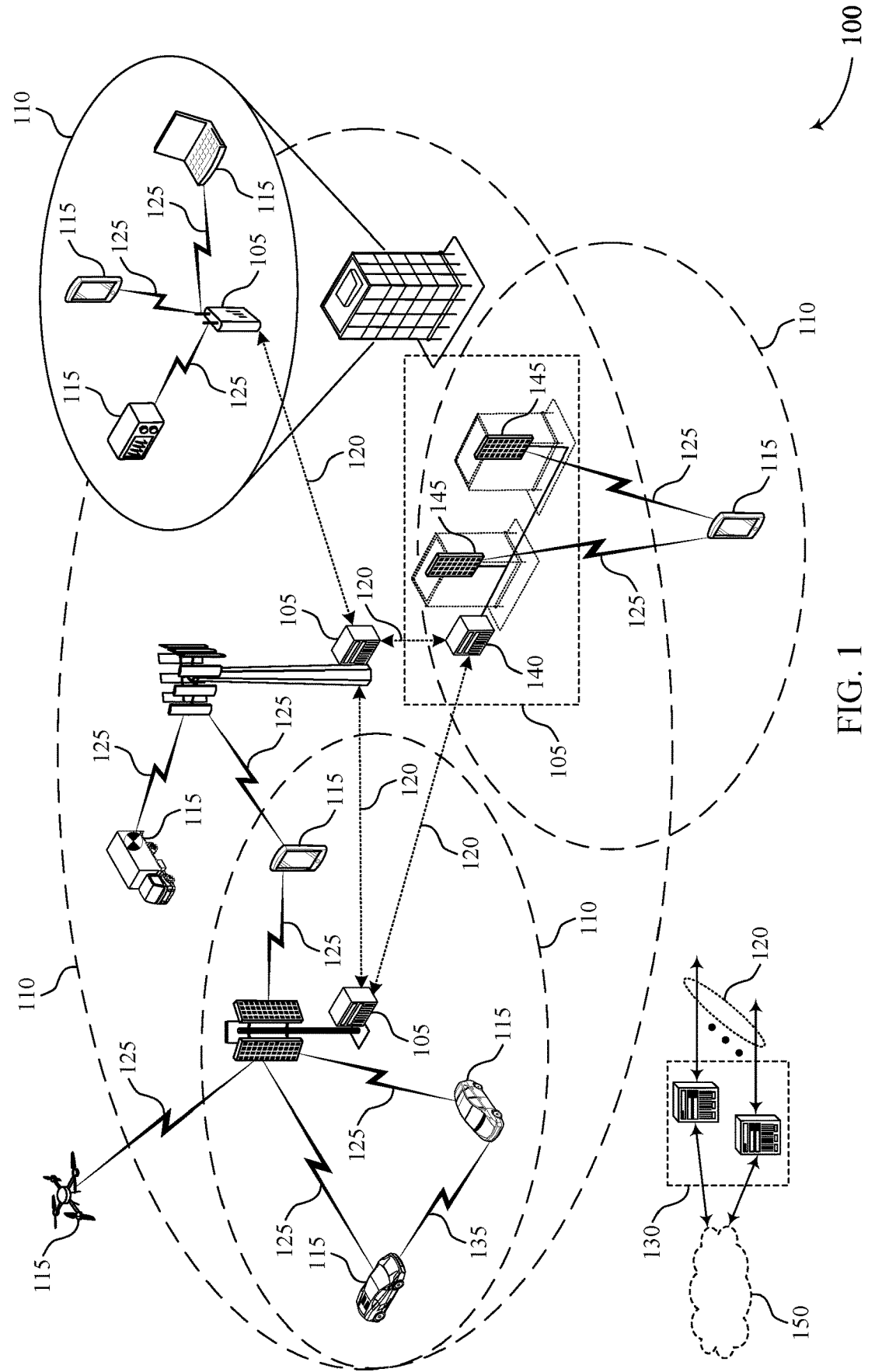
FIG. 1 illustrates an example of a wireless communications system that supports frequency-selective uplink precoding in accordance with aspects of the present disclosure.

A wireless communications system may include communication devices, such as a base station (e.g., an eNodeB (eNB), a next-generation NodeB or a giga-NodeB, any of which may be referred to as a gNB, or some other base station) or a user equipment (UE) that may support multiple radio access technologies. Examples of radio access technologies include fourth generation (4G) systems such as Long Term Evolution (LTE) systems, and fifth generation (5G) systems which may be referred to as New Radio (NR) systems. In the wireless communications system, a UE may perform uplink codebook-based precoding, in which a base station may transmit downlink control information (DCI) to the UE to indicate an uplink precoder for the UE to use for a subsequent uplink transmission. A value in a transmit precoding matrix indicator (TPMI) field in the DCI may point to a precoding matrix of a set of precoding matrices in a codebook for the UE. A quantity of precoding matrices in the codebook and a size of the precoding matrices may be based on a quantity of antennas supported by the UE. For example, as the quantity of UE antennas increases, the size of the codebook may increase.

Indicating a precoder on a per-subband basis (e.g., frequency-selective precoding) may improve communication reliability. However, some techniques for indicating uplink precoding information may support indicating wideband precoding information but may not support indicating frequency-selective precoding information. For example, the DCI or a physical downlink control channel (PDCCH) that carries an indication of wideband precoding information may have a relatively limited capacity, such that the DCI may not support an increased quantity of bits. As such, the quantity of bits in the DCI may not support relatively large codebook sizes or frequency-selective precoding (e.g., may not support multiple subband-specific precoding information indicators).

To support enhanced uplink precoding techniques, a base station as described herein may transmit uplink precoding matrix indicator (PMI) information via one or more downlink messages or control messages that are different than DCI (e.g., control messages transmitted via a different channel that includes a greater capacity than a PDCCH). The one or more downlink messages or control messages may support more capacity for indicating enhanced PMI information, such as uplink PMI information for a relatively complex UE, per-subband uplink PMI information, or both, as compared to DCI messages or an individual field within DCI.

A UE that is configured to support enhanced uplink precoding may receive a first control message, a second control message, and a downlink message from a base station. The first control message may indicate a set of downlink resources for the downlink message associated with uplink precoding information for the UE. The second control message may indicate a set of uplink resources for an uplink message. The downlink message, the second control message, or both may include subband uplink precoding information for the UE. For example, the downlink message, the second control message, or both may point to a precoding matrix from a relatively large codebook, may indicate frequency-selective (e.g., per-subband) precoding information, or both. The UE may transmit the uplink message via the set of uplink resources using the indicated subband uplink precoding information.

In some examples, a base station may transmit multiple downlink messages to the UE, each of which may include one or more sets of per-subband uplink PMI information (where each set of per-subband uplink PMI information may be referred to as a channel state information (CSI) option), and the second control message may include an uplink grant that indicates one of the CSI options that includes relevant uplink precoding information for the UE (e.g., indicates the particular CSI option according to which the UE is to transmit the granted uplink transmission). Alternatively, the base station may transmit the second control message including an uplink grant to the UE to indicate that subband-specific precoding is to be used for the uplink message (e.g., as opposed to wideband precoding), and the base station may subsequently transmit a downlink message that conveys the relevant subband uplink precoding information for the UE. In other examples, the base station may transmit the first control message (e.g., a DCI message) to schedule the downlink message, which may include a physical downlink shared channel (PDSCH) transmission. The PDSCH transmission may be associated with or may carry a medium access control-control element (MAC-CE) that includes an uplink grant. The uplink grant may represent the second control message and may include subband uplink precoding information for the UE. The uplink grant may additionally or alternatively schedule a set of uplink resources for an uplink message. Using these or other aspects of the techniques described herein, a base station and a UE may support frequency-selective (e.g., subband-specific, per-subband) uplink precoding.

Aspects of the disclosure are initially described in the context of wireless communications systems. Additional aspects are described in the with reference to communication timelines and a process flow. Aspects of the disclosure are further illustrated by and described with reference to apparatus diagrams, system diagrams, and flowcharts that relate to frequency-selective uplink precoding.

FIG. 1 illustrates an example of a wireless communications system 100 that supports frequency-selective uplink precoding in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a subband, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Trans-missions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indi-cation of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type code-book, a linear combination type codebook, a port selection type codebook). Although these techniques are described with reference to signals transmitted in one or more direc-tions by a base station 105, a UE 115 may employ similar techniques for transmitting signals multiple times in differ-ent directions (e.g., for identifying a beam direction for subsequent transmission or reception by the UE 115) or for transmitting a signal in a single direction (e.g., for transmit-ting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of the wireless communications system 100, a base station 105 may transmit subband uplink precoding information (which may include subband-specific precoding information for multiple different subbands, and which may alternatively be referred to as frequency-selective uplink precoding information) to a UE 115. The base station 105 may transmit a first control message to the UE 115 to indicate a set of downlink resources for a downlink message associated with the subband uplink precoding information. The base station 105 may transmit a second control message to the UE 115 to indicate a set of uplink resources for an uplink message to be transmitted by the UE 115. The base station 105 may additionally transmit the downlink message to the UE 115 via the set of downlink resources indicated by the first control message. The downlink message, the second control message, or both, may include the subband uplink precoding information for the UE 115.

In some examples, the downlink message may be transmitted via a MAC-CE, a PDSCH, a control channel configured for CSI reporting, or any combination thereof, and the second control message may include an uplink grant that indicates or schedules the uplink message. Additionally or alternatively, the downlink message may include a PDSCH transmission and the second control message may be a MAC-CE including an uplink grant that is transmitted via the PDSCH transmission. In such cases, the uplink grant may indicate the subband uplink precoding information. The UE 115 may transmit the uplink message to the base station 105 via the set of uplink resources indicated by the second control message and using the indicated subband uplink precoding information.

Figure 2:
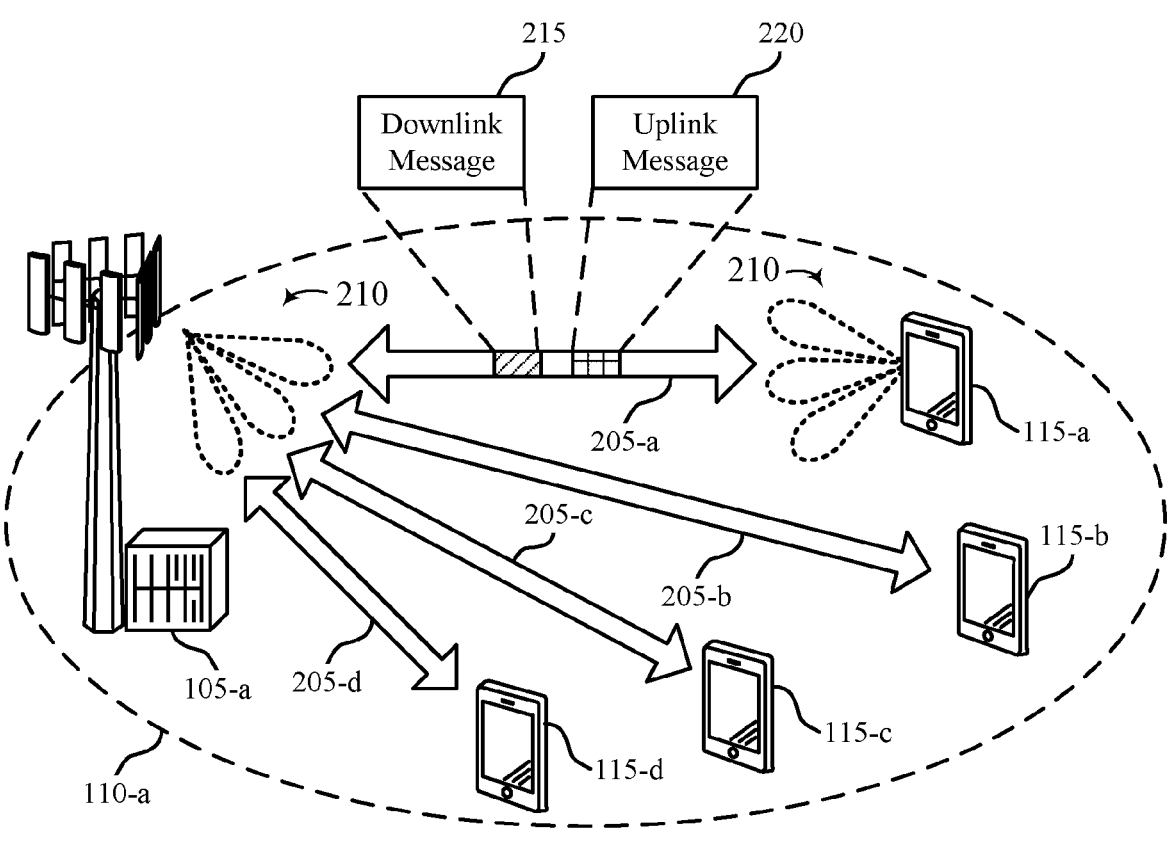
FIG. 2 illustrates an example of a wireless communications system that supports frequency-selective uplink precoding in accordance with aspects of the present disclosure.

FIG. 2 illustrates an example of a wireless communications system 200 that supports frequency-selective uplink precoding in accordance with aspects of the present disclosure. The wireless communications system 200 may implement aspects of the wireless communications system 100 or may be implemented by aspects of the wireless communications system 100. For example, the wireless communications system 200 may include a base station 105-a and UEs 115-a, 115-b, 115-c, and 115-d (e.g., among other UEs 115), which may represent examples of a base station 105 and a UE 115 as described with reference to FIG. 1. The base station 105-a may communicate with the UEs 115 within the geographic coverage area 110-a and via respective communication links 205 (e.g., communication links 205-a, 205-b, 205-c, and 205-d). In some examples, the base station 105-a may transmit subband uplink precoding information to a UE 115 via one or more downlink messages 215 or control messages to improve uplink precoding techniques.

The base station 105-a and each of the UEs 115 may communicate using non-beamform communications and/or beamformed communications (e.g., using a respective set of beams 210). The base station 105-a and each of the UEs 115 may support a set of antennas (e.g., antenna modules or digital antenna ports). Each antenna or combination of antennas may be associated with one or more respective transmit or receive beams and a transmission configuration indicator (TCI) state of the corresponding device. For example, the base station 105-a may transmit a downlink message 215 to the UE 115-a using a first set of one or more antennas corresponding to a first transmit beam of the set of beams 210 and a first TCI state. In some cases, a quantity of antennas supported by the base station 105-a may be greater than a quantity of antennas supported by each of the UEs 115-a, 115-b, 115-c, and 115-d. In the example of the wireless communications system 200, communications between the base station 105-a and each of the UEs 115 may be precoded, which may support beam alignment between both devices and reduce interference with other communications A base station 105, such as the base station 105-a, may perform downlink precoding, which may be referred to as downlink codebook-based precoding, by transmitting a downlink message 215 to a UE 115 using a transmission scheme that is based on a codebook. The base station 105-a may receive an indication of a downlink precoder for the base station 105-a to use for a subsequent downlink transmission. A UE 115 may transmit a CSI report to the base station 105-a that includes the indication, which may be referred to as PMI information or CSI information. The UE 115 may transmit the CSI report via a physical uplink control channel (PUCCH) or a physical uplink shared channel (PUSCH). The codebook may include multiple lists of precoding matrices, and each list may correspond to a rank value (e.g., rank one, rank two, and the like). The PMI information may point to a precoding matrix from the multiple precoding matrices of the codebook supported by the base station 105-a.

The precoding matrices within the codebook may be wideband matrices (e.g., applicable to multiple frequency bands), subband precoding matrices, or both, and may be organized according to one or more ranks, precoding modes, antenna port configurations or any combination thereof. The base station 105-a may support one or more types of codebooks (e.g., a Type-I single panel codebook, a multi-panel codebook, a Type-II codebook, or some other types of codebooks), one or more types of uplink CSI reporting (e.g., periodic, semi-persistent, or aperiodic reporting on a PUSCH or a PUCCH), or both. As such, the codebook for the base station 105-a may include a relatively large quantity of precoding matrices and may support a relatively large quantity of downlink antennas at the base station 105-a.

The CSI report transmitted by the UE 115 may include a set of bits to convey the PMI information, and a quantity of bits in the set may be based on a type of the precoding matrix, a type of codebook, a precoding mode, a rank, or any combination thereof. For example, for a downlink Type-I single-panel codebook, the PMI information may include a first quantity of bits, $I_1$, to indicate beam information (e.g., a beam type or direction) and a second quantity of bits, $I_2$, to indicate phase information for the downlink transmission (e.g., a configuration for combining one or more antenna port phases for the downlink transmission). The $I_1$ and 12 values may be used by the base station 105-$a$ to identify a precoding matrix from the codebook.

Respective quantities of bits for each of $I_1$ and $I_2$ may be based on a rank of the selected precoding matrix in the codebook, a quantity and configuration of antenna ports of the base station 105-$a$, and whether the base station 105-$a$ utilizes wideband or subband precoding. The beam information may be wideband information and the phase information may be subband information (e.g., a quantity of bits of $I_2$ may be transmitted per subband). As such, to support frequency-selective precoding (per-subband precoding), a relatively large quantity of bits may be needed to convey the phase information, $I_2$, which may increase complexity. A relatively large quantity of bits may also be utilized to convey downlink precoding information for a Type-II codebook (e.g., a downlink Type-II codebook or a downlink eType-II codebook). A capacity of the uplink CSI report conveyed via a PUSCH or PUCCH may support the relatively large quantity of bits for indicating downlink PMI information.

A UE 115 may perform uplink precoding, which may be referred to as uplink codebook-based precoding, by transmitting one or more uplink messages 220 using a transmission scheme that is based on a codebook. The codebook may be hard-coded in the UE 115 or may be configured by the base station 105 during an initial access phase using a high-layer message. In some cases, a base station 105 may transmit a downlink grant including downlink scheduling information via DCI to indicate uplink precoding information for the UE 115. The DCI may include a TPMI field (e.g., some quantity of bits, such as four to six bits) that may indicate a rank value and a codeword for a precoding matrix of a set of precoding matrices in the codebook supported by a UE 115. The indicated precoding matrix may correspond to an uplink precoder the UE 115 is to use for a subsequent uplink transmission. The base station 105 may select the uplink precoder for the UE 115 based on a channel estimation. For example, the UE 115 may transmit an uplink reference signal, such as a sounding reference signal (SRS), to the base station 105, and the base station 105 may estimate the uplink channel based on the SRS. The base station 105 may indicate a TPMI to the UE 115 accordingly.

The DCI may be transmitted via a PDCCH that may have less capacity than a PUSCH or a PUCCH used for transmitting an uplink CSI report for downlink precoding. As such, a quantity of bits in the TPMI field may be less than a quantity of bits in the uplink CSI report, and the corresponding uplink precoding information may be less granular than downlink precoding information. For example, a size of the codebook supported by a UE 115 may be smaller than a codebook supported by a base station 105. In some examples, the size of the codebook may be based on different complexities of the respective devices. That is, a codebook for a base station 105 may include more precoding matrices than a codebook for a UE 115 because the base station 105 may support more antennas than the UE 115. A codebook for uplink codebook-based precoding may, in some examples, be sampled from a downlink codebook used for downlink precoding. In some cases, an uplink codebook for a UE 115 may include wideband precoding information and may not include per-subband precoding information, or an uplink codebook for the UE 115 may not support different types of CSI indication for PUSCH transmission (e.g., aperiodic, semi-persistent, or periodic CSI indication), or both.

Some UEs 115 may support more antennas than other UEs 115 to improve communications. As a quantity of uplink antennas increases, a quantity of uplink precoding matrices in a codebook may increase to support the increased UE complexity (e.g., the uplink precoding information may be more granular). That is, more precise uplink precoding information may be beneficial as a quantity of uplink antennas increases. However, the relatively small capacity of the DCI and PDCCH may not support an increased quantity of bits in the TPMI field to support more granular uplink precoding information, per-subband uplink precoding information, different types of CSI indications, or any combination thereof.

In some cases, uplink precoding information may be categorized into two parts. For example, a first part (Part 1) may include wideband PMI information and a second part (Part 2) may include subband PMI information. Alternatively, the first part may correspond to a first stage codebook associated with beam groups, beam vectors, or both (e.g., a first stage codebook, $W_1$, which may be indicated by a value similar to the $I_1$ value as described above) and the second part may correspond to a second stage codebook associated with phase information (e.g., a second stage codebook, $W_2$, which may be indicated by a value similar to the $I_2$ value as described above). In some cases, the Part 2 information (e.g., subband information) may correspond to more overhead than the Part 1 information. If a single uplink grant (e.g., a DCI message) includes both the Part 1 and Part 2 information, the uplink grant may result in relatively high DCI overhead, scheduling overhead (e.g., due to a PUSCH bandwidth capacity), or latency.

In some cases, a first DCI may convey the Part 1 information and a second DCI may convey the Part 2 information to reduced overhead. A UE 115 may receive the first and second DCI and identify a precoding matrix based on both the first and the second DCI. In such cases, the overhead associated with the Part 2 information may be relatively large (e.g., a quantity of bits for conveying the Part 2 information may be greater than a quantity of available bits in the second DCI). In some cases, the Part 1 information in the first DCI may indicate whether the Part 2 information is relevant for the UE 115, and the Part 2 information reliability may be based on a reliability of the Part 1 information. As such, relatively high PDCCH reliability may be beneficial for reliable precoding communications using such techniques. In other cases, the Part 1 information may be conveyed via DCI and the Part 2 information may be conveyed via a MAC-CE. A capacity of the MAC-CE may be greater than a capacity of the DCI, which may provide for the MAC-CE to support the relatively large Part 2 information. However, the MAC-CE may correspond to more latency than the DCI, which may not support the relatively latency-sensitive Part 2 information.

In some cases, to reduce overhead, subband TPMIs (e.g., Part 2 information) may be signaled to a UE 115 for resource blocks that are allocated for a PUSCH transmission by the UE 115, but not for other resource blocks. Alternatively, in some cases, the subband TPMIs may be signaled to the UE 115 for each resource block in uplink irrespective of a scheduled PUSCH transmission. As such, some techniques for frequency-selective uplink precoding may correspond to relatively high overhead, increased latency, and reduced communication reliability.

The techniques described herein provide for improved uplink precoding by supporting transmission of subband-specific uplink precoding information (for more than one subbands) via one or more messages different than DCI. For example, the base station 105-a may transmit a first control message to the UE 115-a to indicate a set of downlink resources for one or more downlink messages associated with subband uplink precoding information for the UE 115-a and a second control message associated with the downlink message that indicates a set of uplink resources for an uplink message 220 to be transmitted by the UE 115-a in accordance with the subband uplink precoding information. The one or more downlink messages, the second control message, or both may include the subband uplink precoding information for the UE 115-a. The base station 105-a may thereby transmit frequency-selective precoding information to the UE 115-a by utilizing downlink or control messages that include a greater capacity than a DCI. The base station 105-a may, in some examples, additionally transmit DCI that includes a TPMI field configured to indicate wideband uplink precoding information for the UE 115-a. The UE 115-a may receive the messages and use the subband uplink precoding information, the wideband uplink precoding information, or both to transmit a subsequent uplink message 220.

In some examples, the first control message may include a CSI configuration that may configure the UE 115-a to support uplink frequency-selective precoding, which may also be referred to as CSI forwarding for a PUSCH. The CSI configuration may indicate resources for a set of downlink messages 215 each conveying one or more instances of subband uplink precoding information for the UE 115-a, where such instances may be referred to as CSI options. For example, each CSI option may include rank indicator (RI) information (e.g., subband-specific RI information or wideband RI information) and subband-specific PMI information (e.g., Part 1 and Part 2 information, such as $W_1$ and $W_2$ as described above) for the UE 115-a or for a set of UEs 115 that include the UE 115-a (e.g., a single user or a multi-user pairing case). The base station 105-a may transmit the second control message, which may include an uplink grant, to the UE 115-a to indicate uplink resources for an uplink message 220 to be transmitted by the UE 115-a, and to indicate a CSI option from the set of CSI options that includes relevant uplink precoding information for the UE 115-a. The CSI options and corresponding control messages are described in further detail elsewhere herein, including with reference to FIGS. 3 and 4.

Additionally or alternatively, the CSI configuration may indicate a set of resources for a downlink message 215 conveying subband uplink precoding information for the UE 115-a, and the second control message may include an uplink grant that indicates uplink resources for an uplink message 220 and enables communications based on subband-specific precoding for the uplink message 220. The UE 115-a may transmit the uplink message 220 using the subband uplink precoding information indicated via the downlink message 215 in accordance with the uplink grant, which may be described in further detail elsewhere herein, including with reference to FIG. 5.

In some examples, the first control message may include DCI that schedules a PDSCH transmission to the UE 115-a (e.g., a downlink message 215). The PDSCH transmission may be associated with or may include a MAC-CE (e.g., the second control message) including an uplink grant and the subband uplink precoding information for the UE 115-a. Details of the DCI and corresponding PDSCH transmission for uplink precoding are described in further detail elsewhere herein, including with reference to FIG. 6.

The base station 105-a may thereby transmit subband uplink precoding information to each of the UEs 115-a, 115-b, 115-c, 115-d, and one or more other UEs 115 in the geographic coverage area via a downlink message 215, a control message, or both. Each UE 115 may receive the downlink messages 215, the control message, or both and utilize the subband uplink precoding information to transmit an uplink message 220. That is, a UE 115 may transmit an uplink message 220 to the base station 105-a via a set of uplink resources indicated by a control message in accordance with the subband uplink precoding information. By indicating subband uplink precoding information to a UE 115, the base station 105-a may improve communication reliability and support granular uplink precoding information for relatively complex UEs 115 (e.g., UEs 115 that include a relatively large quantity of antennas).

Figure 3:
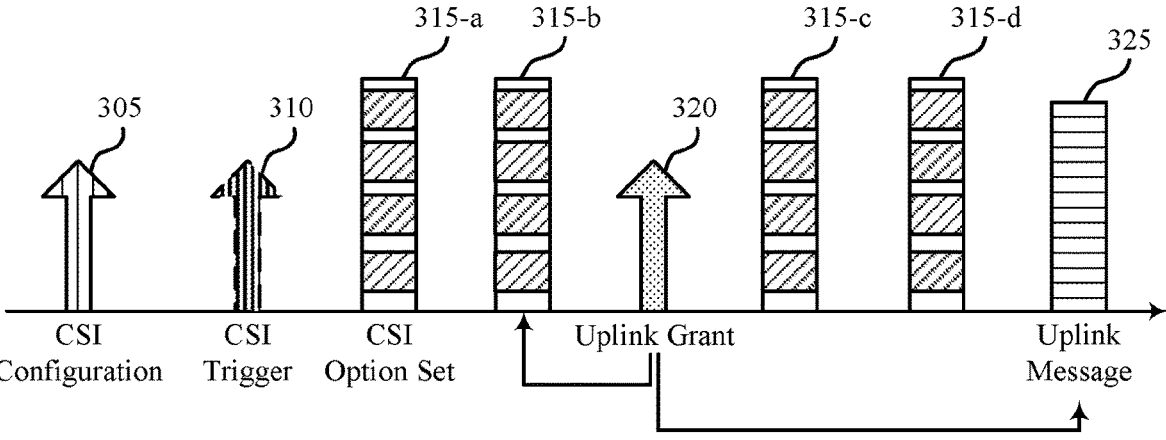
FIG. 3 illustrates an example of a communication timeline that supports frequency-selective uplink precoding in accordance with aspects of the present disclosure.

FIG. 3 illustrates an example of a communication timeline 300 that supports frequency-selective uplink precoding in accordance with aspects of the present disclosure. The communication timeline 300 may implement aspects of the wireless communications systems 100 and 200 or may be implemented by aspects of the wireless communications systems 100 and 200. For example, the communication timeline 300 may illustrate communications between a base station 105 and a UE 115, which may represent examples of a base station 105 and a UE 115 as described with reference to FIGS. 1 and 2. In some examples, the base station 105 may transmit a set of one or more CSI option sets 315 to the UE 115 to indicate subband uplink precoding information.

As described with reference to FIG. 2, a base station 105 may transmit uplink precoding information to a UE 115 via one or more messages that are different from DCI and include a greater capacity than DCI to improve uplink precoding. In the example of FIG. 3, the base station 105 may transmit the uplink precoding information via a set of one or more downlink messages, which may be referred to as CSI option sets 315 (e.g., CSI option sets 315-a, 315-b, 315-c, and 315-d). The base station 105 may transmit the CSI option sets 315 to the UE 115 in a periodic, semi-persistent, or aperiodic manner, and each CSI option set 315 may include a set of one or more subband uplink precoding options (which may alternative be referred to as CSI options) for the UE 115.

The base station 105 may transmit a first control message, which may be or may include a CSI configuration 305, to the UE 115 prior to transmitting the set of CSI option sets 315. The CSI configuration 305 may indicate a quantity of subband uplink precoding options included in each CSI option set 315 (e.g., a maximum quantity of subband uplink precoding options per set of subband uplink precoding options), a quantity of CSI option sets 315 to be transmitted to the UE 115, one or more sets of downlink resources for receiving the set of CSI option sets 315 associated with subband uplink precoding information for the UE 115, a codebook type for the subband uplink precoding information, a codebook mode for the subband uplink precoding information, or any combination thereof. The CSI configuration 305 may additionally or alternatively configure the UE 115 to support uplink frequency-selective precoding, which may also be referred to as CSI forwarding for PUSCH.

In some examples, the CSI configuration 305 may configure the CSI option sets 315 and a periodicity associated with the CSI option sets 315. For example, the CSI configuration 305 may be transmitted via RRC signaling that indicates a periodicity associated with the set of CSI option sets 315, a quantity of CSI option sets 315 to be transmitted, or both. Alternatively, the base station 105 may transmit DCI that schedules (e.g., triggers or activates) each CSI option set 315. The DCI may be or may include the CSI trigger 310. In such cases, the CSI option sets 315 may be transmitted in an aperiodic or semi-persistent manner in accordance with the CSI trigger 310.

The base station 105 may transmit the CSI option sets 315 based on the CSI configuration 305, the CSI trigger 310, or both. Each CSI option set 315 may include a respective set of subband uplink precoding options for the UE 115. The CSI option sets 315 may be transmitted via one or more channels that may be different from a PDCCH, which may provide for increased capacity for conveying the subband uplink precoding information as compared with a TPMI field in DCI. Each may include respective RI information (e.g., wideband RI information, subband RI information, or both) and respective subband PMI information (e.g., W1 and W2 information, as described with respect to FIG. 2, or some other codebook that supports subband PMI) that a UE may use when transmitting an uplink message for which that subband uplink precoding option is indicated. In some cases, the RI information and PMI information of each subband uplink precoding option may correspond to a different single-user or multi-user pairing scenario for the UE 115. In a single-user scenario, the UE 115 may transmit the uplink message 325 alone, and in a multi-user pairing scenario the UE 115 may be scheduled to transmit the uplink message 325 concurrently in a paired fashion with one or more other UEs 115. The RI and subband PMI information may be different for each pairing scenario.

In one example, as illustrated in the example of FIG. 3, each CSI option set 315 may include a respective set of four subband uplink precoding options (e.g., CSI option set 315-*a* may include a first set of four subband uplink precoding options, CSI option set 315-*a* may include a second set of four subband uplink precoding options, and so on). In some cases, the subband uplink precoding options within a CSI option set 315 may be indexed (e.g., subband uplink precoding option 0, subband uplink precoding option 1, and so on).

A first subband uplink precoding option may indicate a first set of subband PMI information and RI information for the UE 115 (e.g., for the UE 115 when scheduled according to a first scheduling scenario, such as a single-user scenario), a second subband uplink precoding option may indicate a second set of subband PMI information and RI information for the UE 115 (e.g., for the UE 115 when scheduled according to a second scheduling scenario, such as a multi-user pairing scenario in which the UE 115 and the second UE 115 are scheduled to concurrently transmit uplink messages), a third subband uplink precoding option may indicate a third set of subband PMI information and RI information for the UE 115 (e.g., for the UE 115 when scheduled according to a third scheduling scenario, such as a multi-user pairing scenario in which the UE 115 and the third UE 115 are scheduled to concurrently transmit uplink messages), and a fourth subband uplink precoding option may indicate a fourth set of subband PMI information and RI information for the UE 115 (e.g., a multi-user pairing scenario in which the UE 115, the second UE 115, and the third UE 115 are scheduled together).

The CSI option sets 315 may be transmitted via a PDSCH, a control channel configured for uplink CSI, a MAC-CE, or any combination thereof. In some examples, one or more of the CSI option sets 315 may be transmitted via a PDSCH. In such cases, a subband CSI option set 315 may be embedded and indicated on a PDSCH. The CSI information may, in some examples, be multiplexed with the downlink shared channel according to one or more rate matching rules (e.g., pre-configured rate matching rules). The PDSCH resources for conveying the CSI option sets 315 may be allocated via a scheduling DCI, an RRC configuration, or both. For example, for aperiodic or semi-persistent reporting of the CSI option sets 315, the CSI trigger 310 (e.g., including DCI or an RRC configuration) may allocate PDSCH resources for a CSI option set 315. For periodic reporting of the CSI option sets 315, the PDSCH resources for the CSI option sets 315 may be configured by RRC signaling. For example, the CSI configuration 305 may be transmitted via RRC signaling and may indicate the PDSCH resources for the CSI option sets 315.

In some examples, one or more of the CSI option sets 315 may be transmitted via a downlink control channel configured for uplink CSI. The UE 115 may receive a control message from the base station 105 that allocates a set of UE-specific downlink resources for the downlink control channel associated with the UE 115 and configured to convey subband CSI option sets 315. The downlink control channel configured for uplink CSI may be different from a PDCCH. For example, the UE 115 may perform blind decoding to identify a PDCCH transmission, whereas the downlink control channel configured for uplink CSI may be scheduled via a control message. The UE 115 may identify a CSI option set 315 transmitted via the downlink control channel configured for uplink CSI based on the control message that indicates a location of resources for the downlink control channel (e.g., instead of performing blind decoding). The control message may be transmitted via DCI or RRC signaling. The CSI option sets 315 transmitted via the control channel may be scheduled according to a DCI, such as the CSI trigger 310, or configured via an RRC configuration, such as the CSI configuration 305. In some examples, one or more of the CSI option sets 315 may be transmitted via a MAC-CE, as described in further detail elsewhere herein, including with reference to FIG. 4.

The base station 105 may transmit a second control message, which may be or may include an uplink grant 320, to the UE 115 to indicate a set of uplink resources for an uplink message 325 to be transmitted by the UE 115. The uplink grant 320 may be transmitted via DCI. The uplink grant 320 may, in some examples, include a TPMI field configured to indicate wideband uplink precoding information, as described with reference to FIG. 2. The TPMI field may include a relatively small quantity of bits to indicate an uplink precoding matrix from a relatively small codebook supported by a UE 115.

As described herein, the uplink grant 320 may additionally or alternatively indicate a subband uplink precoding option that corresponds to subband uplink precoding information for the UE 115. For example, the uplink grant 320 may indicate, from among the set of subband uplink precoding options conveyed via the CSI option set 315 most recently received by the UE 115, which subband uplink precoding option is applicable to the uplink message associated with the uplink grant 320. That is, the UE 115 may be configured to identify, from the uplink grant 320, an index of a subband uplink precoding option and select the corresponding subband uplink precoding option from a CSI option set 315 that was received most recently prior to the uplink grant 320 (e.g., in the example of FIG. 3, the UE 115 may select, from among the subband uplink precoding options conveyed via the CSI option set 315-*b*, a particular subband uplink precoding option as indicated by the uplink grant 320 and then transmit the uplink message 325 using a subband-specific precoder that corresponds to that particular subband uplink precoding option). As another example, the uplink grant 320 may indicate which CSI option set 315 the UE 115 is to reference (e.g., select from) along with the selected subband uplink precoding option from that indicated CSI option sets 315 (e.g., the uplink grant 320 may indicate a CSI option set 315 and a corresponding index of a subband uplink precoding option). The uplink grant 320 may or may not indicate whether the selected subband uplink precoding option corresponds to a single-user or a multi-user paring scenario. The UE 115 may utilize the indicated subband uplink precoding information, the wideband precoding information indicated via the TPMI field of the uplink grant 320, or both to transmit the uplink message 325 via the indicated uplink resources.

The base station 105 may transmit an indication of the subband uplink precoding option via the TPMI field in the uplink grant 320, via one or more other bits or fields in the uplink grant 320, or both. In some examples, a first set of values of the TPMI field (e.g., values between zero and 123, or some other set of values) may be configured to indicate wideband precoding information (e.g., a wideband TPMI state or precoding matrix from a codebook) and a second set of values of the TPMI field (e.g., values between 124 and 127, or some other set of values) may be configured to indicate a subband uplink precoding option from among a set of subband uplink precoding operations included in the respective CSI option set 315-*a*. For example, a first value of the second set of values of the TPMI field may correspond to a first subband uplink precoding option of the set of subband uplink precoding options. The UE 115 may determine whether to use wideband uplink precoding information or the subband uplink precoding information based on whether a value of the TPMI field is within the first set or the second set of values, respectively.

In some examples, the uplink grant 320 may include the TPMI field and a second field (e.g., a one bit DCI field) configured to indicate how to interpret the TPMI field. That is, the second field may indicate whether a value of the TPMI field corresponds to a respective wideband uplink precoding option for the UE 115 or whether the value of the TPMI field corresponds to a respective subband uplink precoding option from a set of subband uplink precoding options associated with the CSI option set 315-*a*. The UE 115 may determine whether to transmit the uplink message 325 using the wideband uplink precoding option or the indicated subband uplink precoding option based on a value of the second field (e.g., whether the bit is set or not).

In some examples, the uplink grant 320 may include the TPMI field which corresponds to wideband precoding information for the UE 115, a second field which indicates a subband uplink precoding option, and a third field (e.g., a one bit DCI field) that indicates whether the UE 115 is to use wideband precoding based on the TPMI field or use subband uplink precoding based on the second field. That is, the uplink grant 320 may indicate both wideband and subband uplink precoding information. If the third field indicates that the UE 115 is to use wideband uplink precoding, the UE 115 may transmit the uplink message 325 in accordance with a wideband uplink precoding option indicated by the value of the TPMI field. If the third field indicates that the UE 115 is to use subband uplink precoding, the UE 115 may transmit the uplink message 325 in accordance with a subband uplink precoding option indicated by a value of the second field. If the third field indicates that the UE 115 is to use subband uplink precoding, and the UE 115 fails to receive or decode the CSI option set 315-*a*, the UE 115 may transmit the uplink message 325 using the wideband uplink precoding option indicated by the value of the TPMI field, which may provide for reduced latency and improved communication reliability if the UE 115 fails to receive a CSI option set 315.

The UE 115 and the base station 105 may thereby support frequency-selective uplink precoding based subband uplink precoding information transmitted via a set of CSI option sets 315. The respective sets of subband uplink precoding options in each CSI option set 315 may be updated over time, and the uplink grant 320 may point to a most recent CSI option set 315. As such, the CSI option sets 315 may provide for efficient communications and improved communication reliability.

Figure 4:
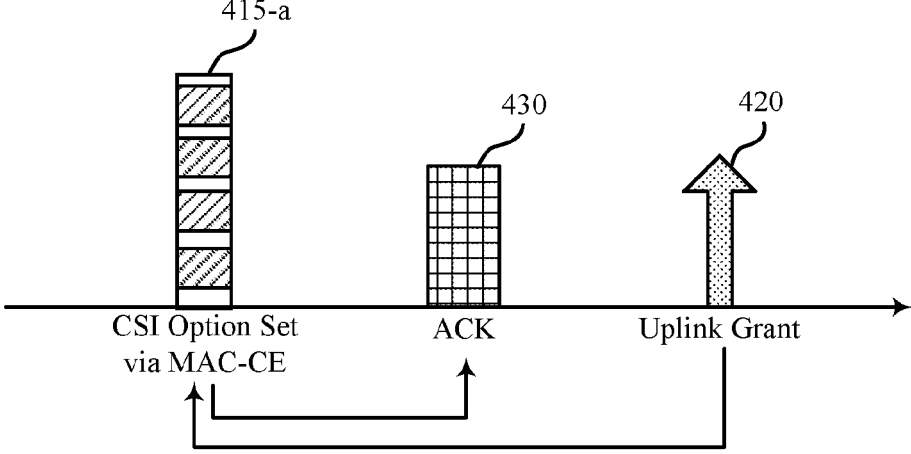
FIG. 4 illustrates an example of a communication timeline that supports frequency-selective uplink precoding in accordance with aspects of the present disclosure.

FIG. 4 illustrates an example of a communication timeline 400 that supports frequency-selective uplink precoding in accordance with aspects of the present disclosure. The communication timeline 400 may implement aspects of the wireless communications systems 100 and 200 or may be implemented by aspects of the wireless communications systems 100 and 200. For example, the communication timeline 400 may illustrate communications between a base station 105 and a UE 115, which may represent examples of a base station 105 and a UE 115 as described with reference to FIGS. 1 through 3.

In the example of FIG. 4, the base station 105 may transmit a CSI option set 415-*a* to the UE 115 via a MAC-CE. The CSI option set 415-*a* may represent an example of a CSI option set 315 as described with reference to FIG. 3. For example, the CSI option set 415-*a* may include a set of one or more subband uplink precoding options for the UE 115, and each subband uplink precoding option may include respective subband PMI information and RI information for the UE 115 or for a set of UEs 115 that includes the UE 115. In some examples, the downlink MAC-CE may include one or more fields or information elements that are configured to convey the subband uplink precoding options within the CSI option set 415-*a*. The CSI option set 415-*a* may be configured by a CSI configuration or scheduled by a CSI trigger with one or more other CSI option sets 415, as described with reference to FIG. 3.

If the UE 115 successfully receives and decodes the CSI option set 415-*a*, the UE 115 will transmit an acknowledgment (ACK) 430 to the base station 105. The base station 105 may transmit an uplink grant 420 to the UE 115 after the base station 105 receives the ACK 430 from the UE 115. That is, the if the UE 115 is scheduled to transmit the ACK 430 in a first slot, n, the uplink grant 420 indicating the CSI option set 415-*a* may be transmitted in a slot that is after n+X, where X may be a configured time period (e.g., 3 ms, a quantity of slots, or some other time period). The uplink grant 420 may indicate a subband uplink precoding option from the set of subband uplink precoding options included in the CSI option set 415-*a*. The uplink grant 420 may represent an example of the uplink grant 320 as described with reference to FIG. 3.

If the base station 105 transmits the uplink grant 420 prior to the ACK 430, or if the UE 115 transmits a negative acknowledgement (NACK) instead of the ACK 430, the uplink grant 420 may indicate a subband uplink precoding option corresponding to a CSI option set 415 that is transmitted prior to the CSI option set 415-*a* in time. That is, the UE 115 may assume that the uplink grant 420 indicates a subband uplink precoding option from a previously received and acknowledged CSI option set 415. Additionally or alternatively, the base station 105 may refrain from transmitting the uplink grant 420 until the base station 105 receives an ACK 430 from the UE 115 in response to the CSI option set 415-*a*.

The base station 105 may thereby transmit one or more CSI option sets 415 via respective MAC-CEs. An uplink grant 420 transmitted by the base station 105 may indicate a subband uplink precoding option within a MAC-CE based on the MAC-CE being a most recent MAC-CE acknowledged by the UE 115.

Figure 5:
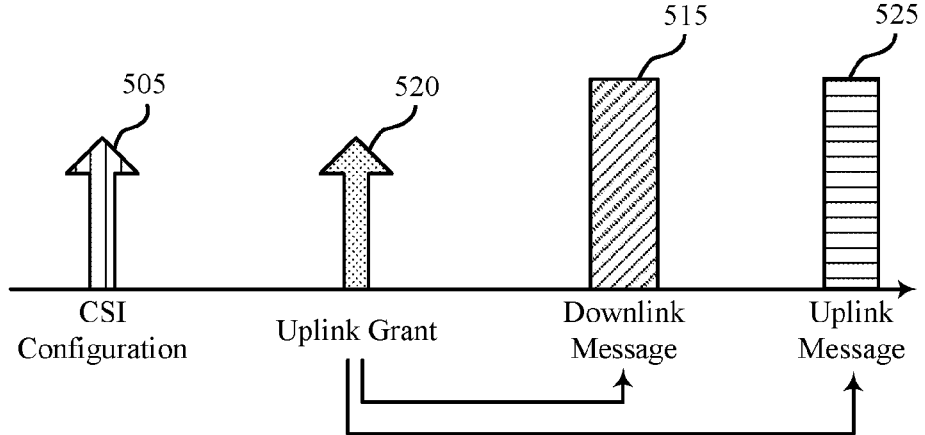
FIG. 5 illustrates an example of a communication timeline that supports frequency-selective uplink precoding in accordance with aspects of the present disclosure.

FIG. 5 illustrates an example of a communication timeline 500 that supports frequency-selective uplink precoding in accordance with aspects of the present disclosure. The communication timeline 500 may implement aspects of the wireless communications systems 100 and 200 or may be implemented by aspects of the wireless communications systems 100 and 200. For example, the communication timeline 500 may illustrate communications between a base station 105 and a UE 115, which may represent examples of a base station 105 and a UE 115 as described with reference to FIGS. 1 through 4. In some examples, the base station 105 may transmit subband uplink precoding information to the UE 115 via a downlink message 515.

The base station 105 may transmit a first control message including a CSI configuration 505, which may be an example of a CSI configuration 305 as described with reference to FIG. 3. The CSI configuration 505 may configure the UE 115 to support uplink frequency-selective precoding. In some examples, the CSI configuration 505 may indicate a set of downlink resources for a downlink message 515 associated with subband uplink precoding information for the UE 115.

In the example of FIG. 5, the base station 105 may subsequently transmit a second control message including an uplink grant 520 to the UE 115 to indicate a set of uplink resources for an uplink message 525 to be transmitted by the UE 115. The uplink grant 520 may include a field, which may be referred to as a subband PMI indication, that is configured to indicate (e.g., enable or disable) subband-specific precoding for the uplink message 525. If the subband PMI indication is ON, the subband-specific precoding for the uplink message 525 is enabled, and the base station 105 may subsequently transmit the downlink message 515 including subband uplink precoding information for the UE 115. The UE 115 may receive the downlink message 515 in accordance with the indication of the subband-specific precoding. The UE 115 may transmit the uplink message 525 via the set of uplink resources and using the indicated subband uplink precoding information based on the uplink grant 520.

The uplink grant 520 may additionally or alternatively include a TPMI field configured to convey wideband precoding information for the UE 115. If the subband PMI indication is OFF in the uplink grant 520, subband-specific precoding for the uplink message 525 may is disabled. In such cases, the UE 115 may transmit the uplink message 525 via the set of uplink resources using the wideband precoding information indicated via the TPMI field. The base station 105 may transmit the downlink message 515 including subband uplink precoding information if the subband-specific precoding is disabled. Alternatively, if the subband PMI configuration is disabled, the base station 105 may refrain from transmitting the downlink message 515.

The downlink message 515 may be transmitted via a set of downlink resources that may be allocated by the CSI configuration 505, the uplink grant 520, or both. The downlink message 515 may be transmitted via a PDSCH (e.g., CSI on PDSCH), via a control channel configured for CSI, or via a MAC-CE, as described in further detail elsewhere herein, including with reference to FIGS. 3 and 4. The downlink message 515 may, in some examples, be referred to as a subband CSI for PUSCH.

The base station 105 may thereby transmit subband uplink precoding information for the UE 115 via a downlink message 515 indicated by an uplink grant 520. The UE 115 may transmit an uplink message 525 based on the indicated subband uplink precoding information or wideband precoding information included in the uplink grant 520. Such techniques may provide for the base station 105 to indicate subband uplink precoding information to the UE 115, which may improve communication reliability and coordination between devices.

Figure 6:
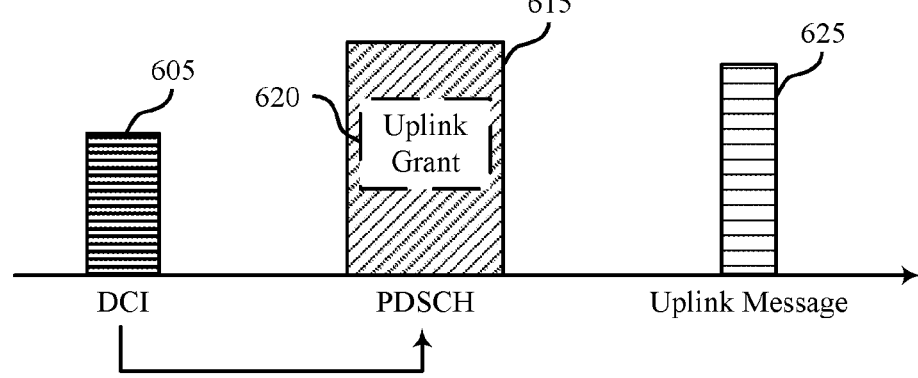
FIG. 6 illustrates an example of a communication timeline that supports frequency-selective uplink precoding in accordance with aspects of the present disclosure.

FIG. 6 illustrates an example of a communication timeline 600 that supports frequency-selective uplink precoding in accordance with aspects of the present disclosure. The communication timeline 600 may implement aspects of the wireless communications systems 100 and 200 or may be implemented by aspects of the wireless communications systems 100 and 200. For example, the communication timeline 600 may illustrate communications between a base station 105 and a UE 115, which may represent examples of a base station 105 and a UE 115 as described with reference to FIGS. 1 through 5. In some examples, the base station 105 may transmit an uplink grant via a MAC-CE to indicate subband uplink precoding information to the UE 115.

The base station 105 may transmit a first control message including a DCI 605 to the UE 115. The DCI 605 may schedule a set of downlink resources for a PDSCH transmission 615 (e.g., a downlink message via a PDSCH). The base station 105 may transmit a MAC-CE via the set of downlink resources scheduled by the DCI 605. That is, the MAC-CE may be included in or may be associated with the PDSCH transmission 615 (e.g., the MAC-CE may be transmitted between MAC layers of the UE 115 and the base station 105 via the PDSCH resources). The MAC-CE may carry an uplink grant 620 (e.g., a second control message). The uplink grant 620 may indicate a set of uplink resources for an uplink message 625 to be transmitted by the UE 115. The uplink grant 620 may additionally indicate subband uplink precoding information for the UE 115. In some examples, the uplink grant 620 may include a TPMI field configured to indicate wideband uplink precoding information for the UE 115.

The UE 115 may receive the MAC-CE including the uplink grant 620 and transmit the uplink message 625 via the set of uplink resources using the indicated subband uplink precoding information based on the uplink grant 620. If the UE 115 is configured to support wideband uplink precoding, or if the uplink grant 620 indicates a wideband precoding scenario, the UE 115 may transmit the uplink message 625 using the wideband uplink precoding information indicated via the TPMI field in the uplink grant 620.

The base station 105 may thereby transmit subband uplink precoding information to the UE 115 via an uplink grant 620 in a PDSCH MAC-CE. The PDSCH MAC-CE may include more capacity than a DCI transmitted via a PDCCH, which may provide for the PDSCH MAC-CE to carry the uplink grant 620 including subband uplink precoding information, wideband uplink precoding information, or both for the UE 115. The UE 115 may transmit the uplink message 625 using the subband uplink precoding information, the wideband uplink precoding information, or both, which may provide for improved communication reliability and coordination between devices.

Figure 7:
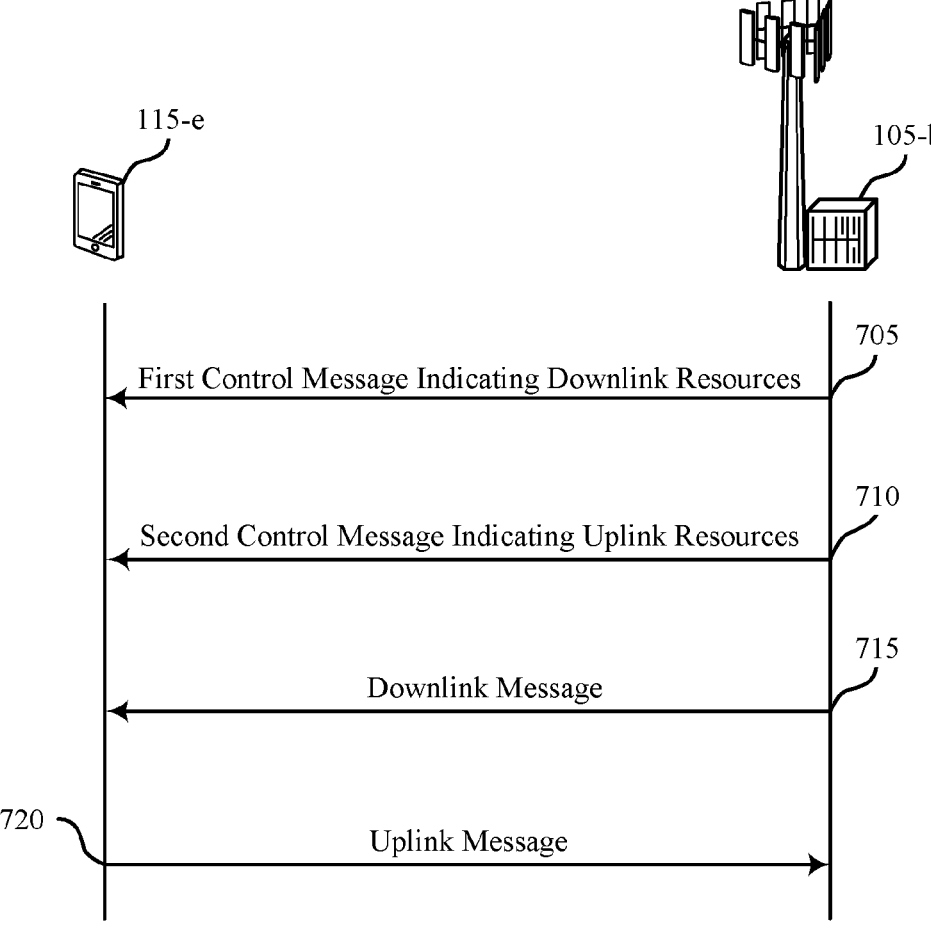
FIG. 7 illustrates an example of a process flow that supports frequency-selective uplink precoding in accordance with aspects of the present disclosure.

FIG. 7 illustrates an example of a process flow 700 that supports frequency-selective uplink precoding in accordance with aspects of the present disclosure. The process flow 700 may implement aspects of the wireless communications systems 100 and 200 or may be implemented by aspects of the wireless communications systems 100 and 200. For example, the process flow 700 may illustrate techniques for communicating subband uplink precoding information between a base station 105-*b* and a UE 115-*e*, which may represent examples of a base station 105 and a UE 115 as described with reference to FIGS. 1 through 6.

In the following description of the process flow 700, the operations between the base station 105-*b* and the UE 115-*e* may be performed in different orders or at different times. For example, certain operations may be left out of the process flow 700, or other operations may be added. Although the base station 105-*b* and the UE 115-*e* are shown performing the operations of the process flow 700, some aspects of some operations may also be performed by one or more other wireless devices.

At 705, the base station 105-*b* may transmit a first control message indicating a set of downlink resources to the UE 115-*e*. The set of downlink resources may be for a downlink message associated with subband uplink precoding information for the UE 115-*e*. In some examples, the first control message may include a CSI configuration, as described with reference to FIGS. 3 through 5. Additionally or alternatively, the first control message may include DCI, as described with reference to FIG. 6, or may be some other type of control message.

At 710, the base station 105-*b* may transmit a second control message associated with the downlink message and indicating a set of uplink resources to the UE 115-*e*. The set of uplink resources may be for an uplink message. The downlink message, the second control message, or any combination thereof may include the subband uplink precoding information for the UE 115-*e*. In some examples, the second control message may include an uplink grant, as described with reference to FIGS. 3 through 5. Additionally or alternatively, the second control message may include a MAC-CE transmitted via a PDSCH, as described with reference to FIG. 6, or may be some other type of control message.

At 715, the base station 105-*b* may transmit the downlink message to the UE 115-*e*. The base station 105-*b* may transmit the downlink message via the set of downlink resources indicated by the first control message. Although the example of FIG. 7 shows base station 105-*b* as transmitting the downlink message after the second control message in the process flow 700, it is to be understood that the base station 105-*b* may transmit the downlink message and the second control message at any time and in any relative order. For example, the base station 105-*b* may transmit the downlink message and the second control message concurrently, or the base station 105-*b* may transmit the downlink message before the second control message in time.

The downlink message may be an example of a PDSCH transmission and the second control message may be an uplink grant that is associated with or included in the PDSCH transmission and includes subband uplink precoding information for the UE 115-*e*, as described with reference to FIG. 6. Additionally or alternatively, the downlink message (e.g., a CSI option set or some other downlink message) may include the subband uplink precoding information for the UE 115-*a*, and the second control message may include an uplink grant that indicates a previously transmitted downlink message, as described with reference to FIGS. 3 and 4. In other examples, the second control message may be an uplink grant that enables communications based on subband-specific uplink precoding for an uplink message, and the base station 105-*b* may transmit the downlink message to include subband uplink precoding information for the UE 115-*e* based on the uplink grant, as described with reference to FIG. 5.

At 720, the UE 115-*e* may transmit, via the set of uplink resources indicated by the second control message, the uplink message to the base station 105-*b*. The UE 115-*e* may transmit the uplink message in accordance with the subband uplink precoding information.

Figure 8:
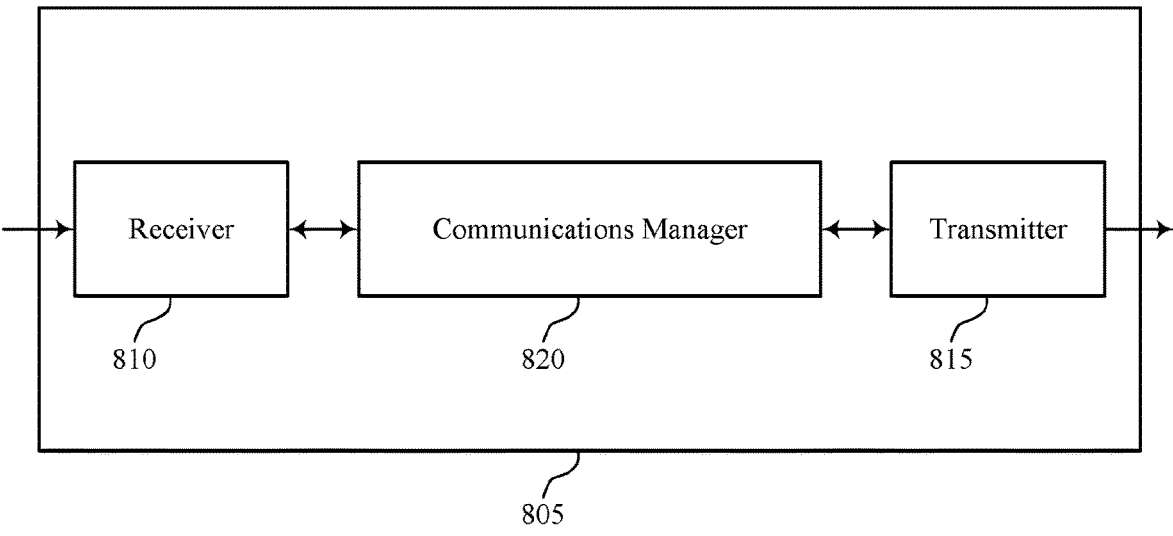
FIGS. 8 and 9 show block diagrams of devices that support frequency-selective uplink precoding in accordance with aspects of the present disclosure.

FIG. 8 shows a block diagram 800 of a device 805 that supports frequency-selective uplink precoding in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to frequency-selective uplink precoding). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to frequency-selective uplink precoding). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of frequency-selective uplink precoding as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving a first control message indicating a set of downlink resources for a downlink message associated with subband uplink precoding information for the UE. The communications manager 820 may be configured as or otherwise support a means for receiving a second control message associated with the downlink message and indicating a set of uplink resources for an uplink message, where the downlink message, the second control message, or any combination thereof includes the subband uplink precoding information for the UE. The communications manager 820 may be configured as or otherwise support a means for receiving the downlink message via the set of downlink resources indicated by the first control message. The communications manager 820 may be configured as or otherwise support a means for transmitting, via the set of uplink resources indicated by the second control message, the uplink message in accordance with the subband uplink precoding information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, more efficient utilization of communication resources, and improved reliability. The device 805 may receive frequency-selective uplink precoding information from a base station, which may improve reliability associated with processing and performing uplink communications. In some examples, the device 805 may receive the subband uplink producing information via a downlink message or a control message different than DCI, and the device 805 may receive wideband uplink precoding information via the DCI, which may provide for more efficient utilization of communication resources and improved communication reliability. Additionally or alternatively, if the processor of the device 805 fails to receive or decode the subband uplink precoding information, the processor may use the wideband uplink precoding information to generate a subsequent uplink message, which may reduce processing and improve reliability.

Figure 9:
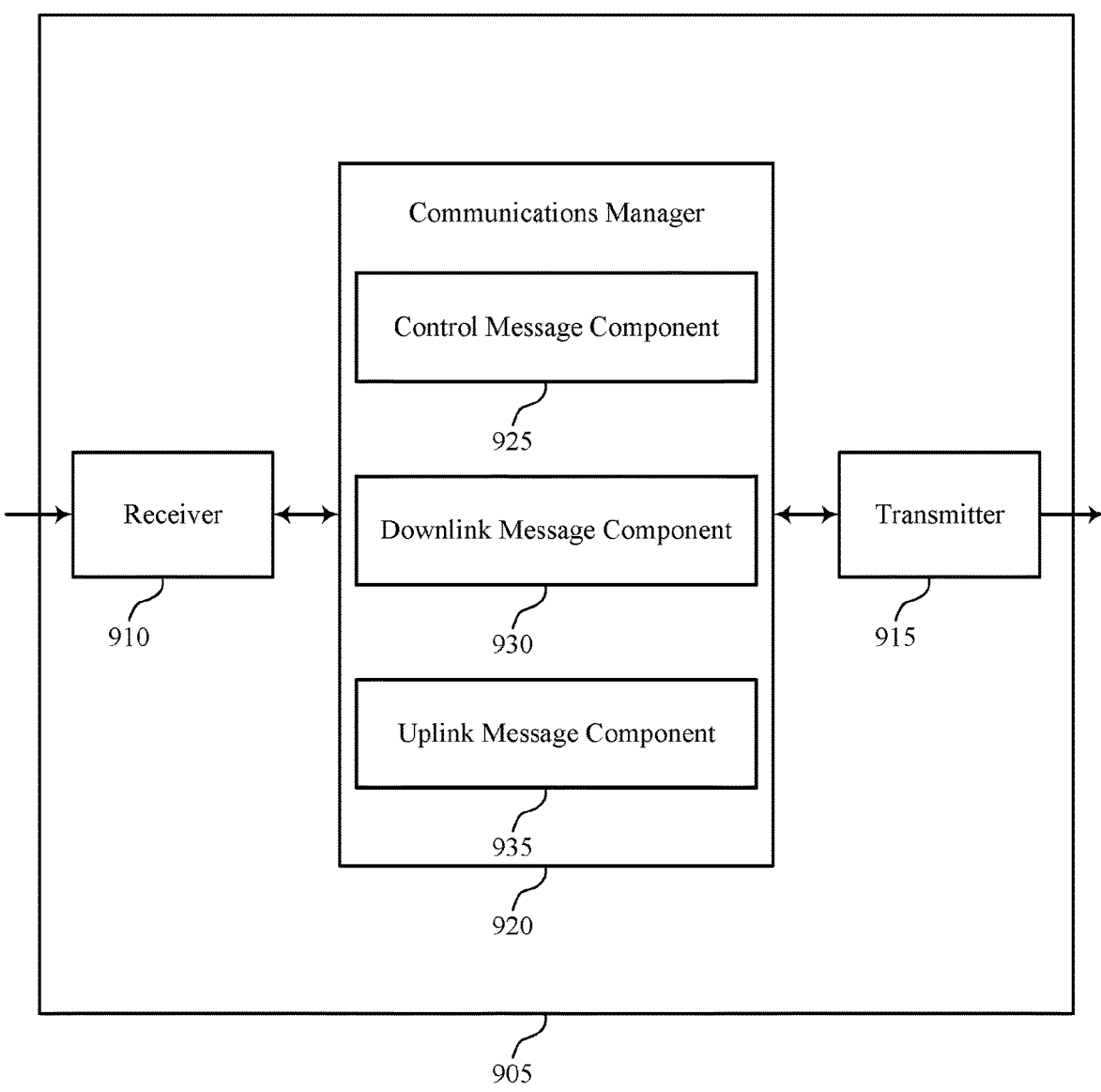

FIG. 9 shows a block diagram 900 of a device 905 that supports frequency-selective uplink precoding in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to frequency-selective uplink precoding). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to frequency-selective uplink precoding). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of frequency-selective uplink precoding as described herein. For example, the communications manager 920 may include a control message component 925, a downlink message component 930, an uplink message component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The control message component 925 may be configured as or otherwise support a means for receiving a first control message indicating a set of downlink resources for a downlink message associated with subband uplink precoding information for the UE. The control message component 925 may be configured as or otherwise support a means for receiving a second control message associated with the downlink message and indicating a set of uplink resources for an uplink message, where the downlink message, the second control message, or any combination thereof includes the subband uplink precoding information for the UE. The downlink message component 930 may be configured as or otherwise support a means for receiving the downlink message via the set of downlink resources indicated by the first control message. The uplink message component 935 may be configured as or otherwise support a means for transmitting, via the set of uplink resources indicated by the second control message, the uplink message in accordance with the subband uplink precoding information.

Figure 10:
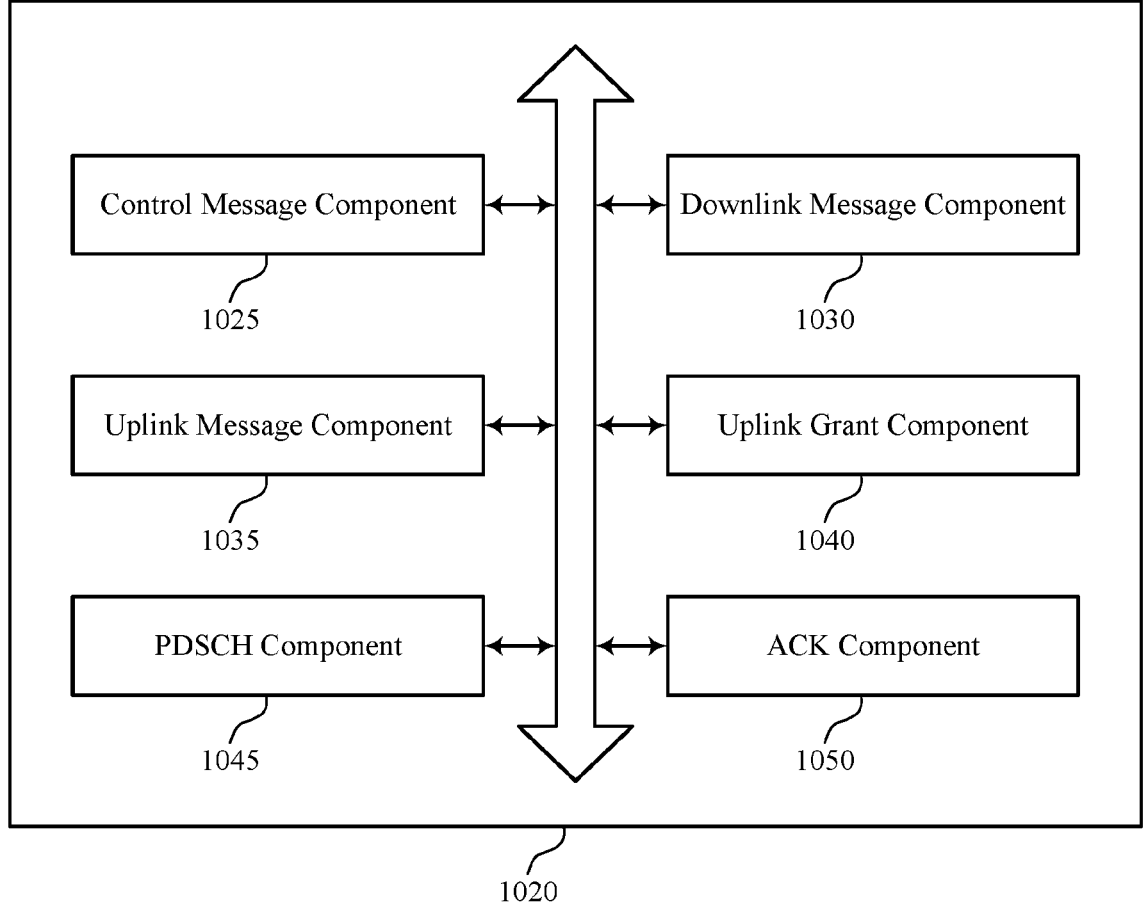
FIG. 10 shows a block diagram of a communications manager that supports frequency-selective uplink precoding in accordance with aspects of the present disclosure.

FIG. 10 shows a block diagram 1000 of a communications manager 1020 that supports frequency-selective uplink precoding in accordance with aspects of the present disclosure. The communications manager 1020 may be an example of aspects of a communications manager 820, a communications manager 920, or both, as described herein. The communications manager 1020, or various components thereof, may be an example of means for performing various aspects of frequency-selective uplink precoding as described herein. For example, the communications manager 1020 may include a control message component 1025, a downlink message component 1030, an uplink message component 1035, an uplink grant component 1040, an PDSCH component 1045, an ACK component 1050, or any combination thereof. Each of these components may communicate, directly or indirectly, with one another (e.g., via one or more buses).

The communications manager 1020 may support wireless communication at a UE in accordance with examples as disclosed herein. The control message component 1025 may be configured as or otherwise support a means for receiving a first control message indicating a set of downlink resources for a downlink message associated with subband uplink precoding information for the UE. In some examples, the control message component 1025 may be configured as or otherwise support a means for receiving a second control message associated with the downlink message and indicating a set of uplink resources for an uplink message, where the downlink message, the second control message, or any combination thereof includes the subband uplink precoding information for the UE. The downlink message component 1030 may be configured as or otherwise support a means for receiving the downlink message via the set of downlink resources indicated by the first control message. The uplink message component 1035 may be configured as or otherwise support a means for transmitting, via the set of uplink resources indicated by the second control message, the uplink message in accordance with the subband uplink precoding information.

In some examples, the downlink message component 1030 may be configured as or otherwise support a means for receiving a set of one or more downlink messages including at least the downlink message. In some examples, each downlink message of the set of one or more downlink messages indicates a respective set of subband uplink precoding options for the UE and the second control message indicates, from among the respective set of subband uplink precoding options included in the downlink message, a subband uplink precoding option corresponding to the subband uplink precoding information for the UE.

In some examples, each subband uplink precoding option of the respective set of subband uplink precoding options included in the downlink message corresponds to a different single-user or multi-user pairing scenario for the UE. In some examples, the first control message indicates a maximum quantity of subband uplink precoding options for each respective set of subband uplink precoding options, one or more sets of downlink resources for receiving the set of one or more downlink messages, a codebook type for the subband uplink precoding information, a codebook mode for the subband uplink precoding information, or any combination thereof.

In some examples, each subband uplink precoding option of the respective set of subband uplink precoding options included in the downlink message includes respective subband PMI information and respective RI information for the UE or for a set of UEs that includes the UE.

In some examples, the control message component 1025 may be configured as or otherwise support a means for receiving RRC signaling indicating a periodicity associated with the set of one or more downlink messages, where the RRC signaling includes the first control message. In some examples, the downlink message component 1030 may be configured as or otherwise support a means for receiving the set of one or more downlink messages in accordance with the periodicity.

In some examples, the control message component 1025 may be configured as or otherwise support a means for receiving DCI that schedules each downlink message of the set of one or more downlink messages. In some examples, the downlink message component 1030 may be configured as or otherwise support a means for receiving the set of one or more downlink messages in an aperiodic or semi-persistent manner in accordance with the DCI.

In some examples, the second control message includes a field for which a first set of values each correspond to a different wideband uplink precoding option for the UE and a second set of values each correspond to a different subband uplink precoding option of the respective set of subband uplink precoding options. In some examples, to indicate the subband uplink precoding option from among the respective set of subband uplink precoding options included in the downlink message, the field has a value that is included in the second set of values and corresponds to the subband uplink precoding option.

In some examples, the second control message includes a first indication of a value and a second indication of whether the value corresponds to a respective wideband uplink precoding option for the UE or corresponds to a respective subband uplink precoding option of the respective set of subband uplink precoding options. In some examples, to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

In some examples, the second control message includes a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based on the first field or the UE is to use subband uplink precoding based on the second field. In some examples, to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

In some examples, to support receiving the second control message, the uplink grant component 1040 may be configured as or otherwise support a means for receiving an uplink grant that indicates the set of uplink resources for transmitting the uplink message.

In some examples, to support receiving the second control message, the uplink grant component 1040 may be configured as or otherwise support a means for receiving, via the second control message, an uplink grant that indicates the set of uplink resources for transmitting the uplink message and enables communications based on subband-specific precoding for the uplink message. In some examples, to support receiving the second control message, the downlink message component 1030 may be configured as or otherwise support a means for receiving the downlink message based on the uplink grant.

In some examples, the uplink grant component 1040 may be configured as or otherwise support a means for receiving a second uplink grant that disables communications based on the subband-specific precoding and indicates a second set of uplink resources for transmitting a second uplink message, the second uplink grant including wideband precoding information for the second uplink message. In some examples, the uplink message component 1035 may be configured as or otherwise support a means for transmitting the second uplink message in accordance with the wideband precoding information and via the second set of uplink resources indicated by the second uplink grant.

In some examples, to support receiving the downlink message, the downlink message component 1030 may be configured as or otherwise support a means for receiving the downlink message via a downlink shared channel.

In some examples, the control message component 1025 may be configured as or otherwise support a means for receiving a third control message that allocates a second set of downlink resources for a downlink control channel associated with the UE. In some examples, the downlink message component 1030 may be configured as or otherwise support a means for receiving the downlink message via the downlink control channel associated with the UE based on the third control message.

In some examples, to support receiving the downlink message, the downlink message component 1030 may be configured as or otherwise support a means for receiving a MAC-CE. In some examples, the ACK component 1050 may be configured as or otherwise support a means for transmitting an ACK message in response to receiving the MAC-CE, where the second control message includes an uplink grant that indicates the MAC-CE based on the MAC-CE being a most recent MAC-CE acknowledged by the UE.

In some examples, receiving the downlink message includes receiving a downlink shared channel transmission via the set of downlink resources. In some examples, the first control message includes DCI that schedules the downlink shared channel transmission. In some examples, receiving the second control message includes receiving a MAC-CE associated with the downlink shared channel transmission, the MAC-CE including an uplink grant that indicates uplink resources for the uplink message and indicates the subband uplink precoding information for the UE.

Figure 11:
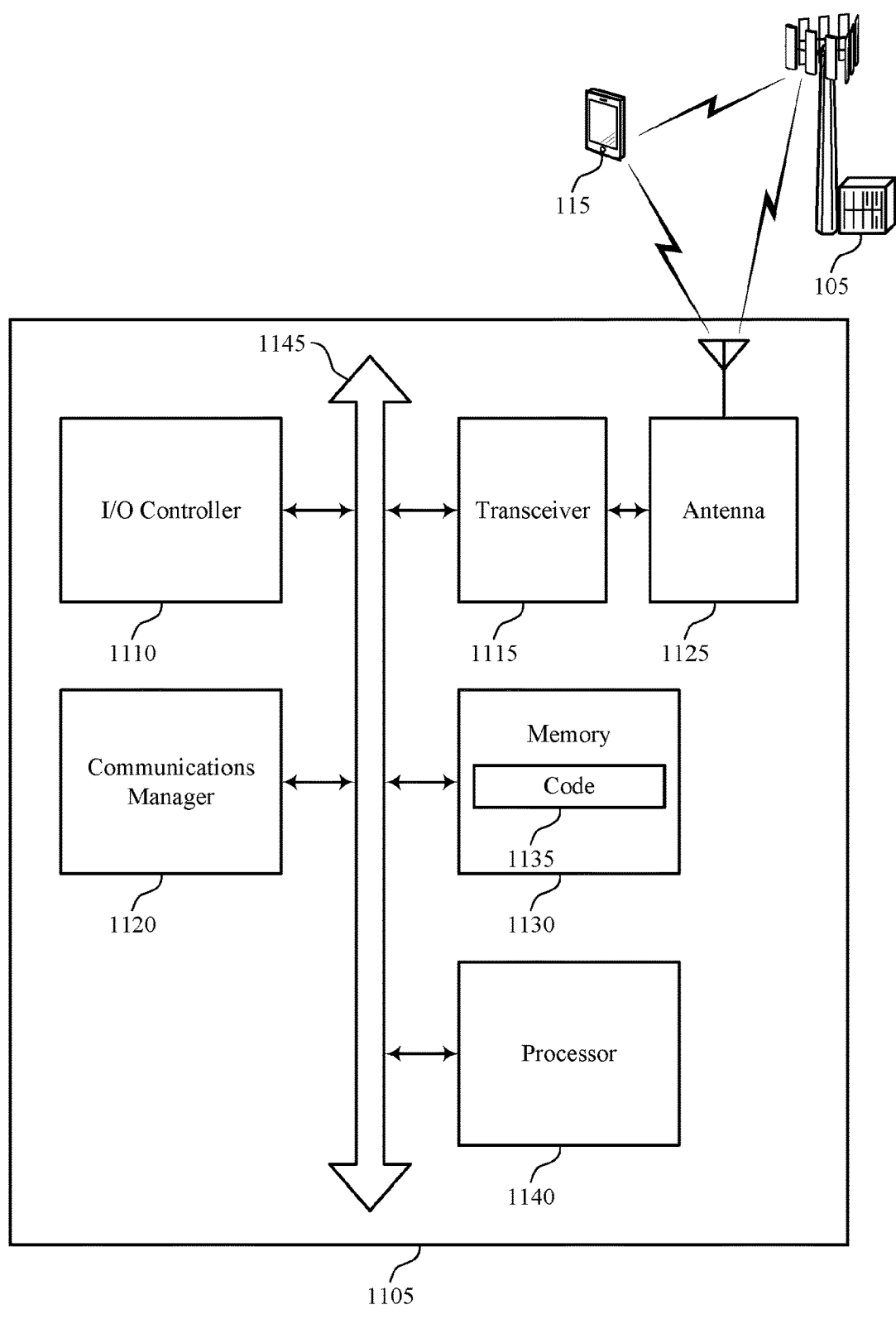
FIG. 11 shows a diagram of a system including a device that supports frequency-selective uplink precoding in accordance with aspects of the present disclosure.

FIG. 11 shows a diagram of a system 1100 including a device 1105 that supports frequency-selective uplink precoding in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting frequency-selective uplink precoding). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving a first control message indicating a set of downlink resources for a downlink message associated with subband uplink precoding information for the UE. The communications manager 1120 may be configured as or otherwise support a means for receiving a second control message associated with the downlink message and indicating a set of uplink resources for an uplink message, where the downlink message, the second control message, or any combination thereof includes the subband uplink precoding information for the UE. The communications manager 1120 may be configured as or otherwise support a means for receiving the downlink message via the set of downlink resources indicated by the first control message. The communications manager 1120 may be configured as or otherwise support a means for transmitting, via the set of uplink resources indicated by the second control message, the uplink message in accordance with the subband uplink precoding information.

By including or configuring the communications manager 1120 in accordance with examples as described herein, the device 1105 may support techniques for improved communication reliability, improved coordination between devices, and improved uplink precoding techniques. The device 1105 may receive uplink precoding information from a base station via a downlink message, a control message, or both. By receiving uplink precoding information via the downlink message, the control message, or both, in addition to or instead of receiving uplink precoding information via a DCI, the device 1105 may support improved coordination between devices and enhanced uplink precoding, such as frequency-selective uplink precoding, relatively large codebook sizes, multiple CSI indications over time, or any combination thereof.

In some examples, the device 1105 may receive subband uplink precoding information via a downlink message and wideband uplink precoding information via a TPMI field in DCI. The device 1105 may use one or both of the subband uplink precoding information and the wideband uplink precoding information to transmit a subsequent uplink message, which may improve coordination between devices and improve communication reliability. In some examples, the device 1105 may receive CSI indications for PUSCH periodically, semi-statically, or aperiodically. That is, the device 1105 may receive multiple indications of subband or wideband uplink precoding information over time. Such techniques may improve uplink precoding techniques and improve communication reliability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of frequency-selective uplink precoding as described herein, or the processor 1140 and the memory 1130 may be otherwise configured to perform or support such operations.

Figure 12:
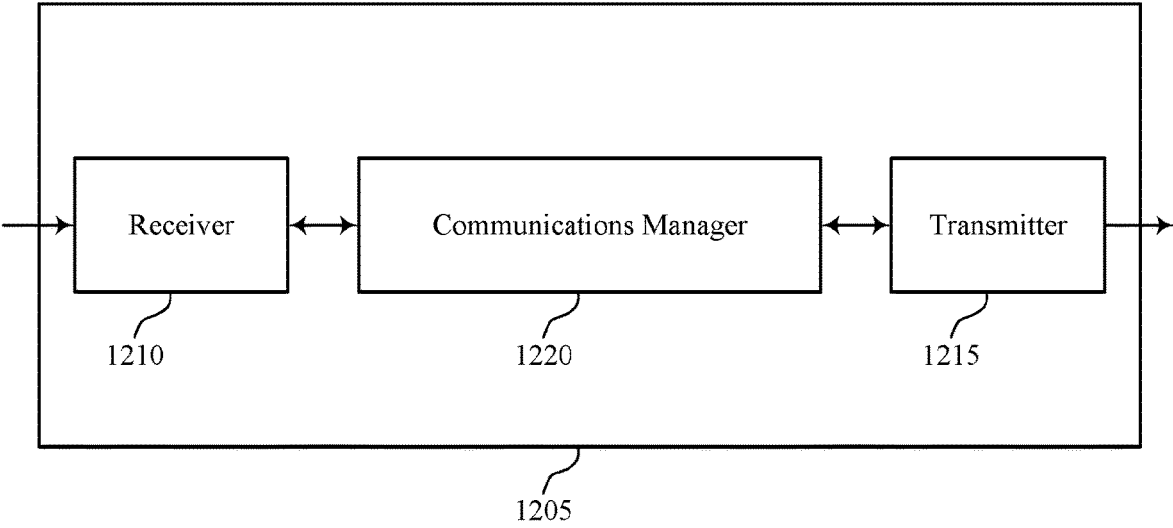
FIGS. 12 and 13 show block diagrams of devices that support frequency-selective uplink precoding in accordance with aspects of the present disclosure.

FIG. 12 shows a block diagram 1200 of a device 1205 that supports frequency-selective uplink precoding in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to frequency-selective uplink precoding). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to frequency-selective uplink precoding). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of frequency-selective uplink precoding as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, a first control message indicating a set of downlink resources for a downlink message associated with subband uplink precoding information for the UE. The communications manager 1220 may be configured as or otherwise support a means for transmitting, to the UE, a second control message associated with the downlink message and indicating a set of uplink resources for an uplink message, where the downlink message, the second control message, or any combination thereof includes the subband uplink precoding information for the UE. The communications manager 1220 may be configured as or otherwise support a means for transmitting, to the UE, the downlink message via the set of downlink resources indicated by the first control message. The communications manager 1220 may be configured as or otherwise support a means for receiving, from the UE via the set of uplink resources indicated by the second control message, the uplink message in accordance with the subband uplink precoding information.

Figure 13:
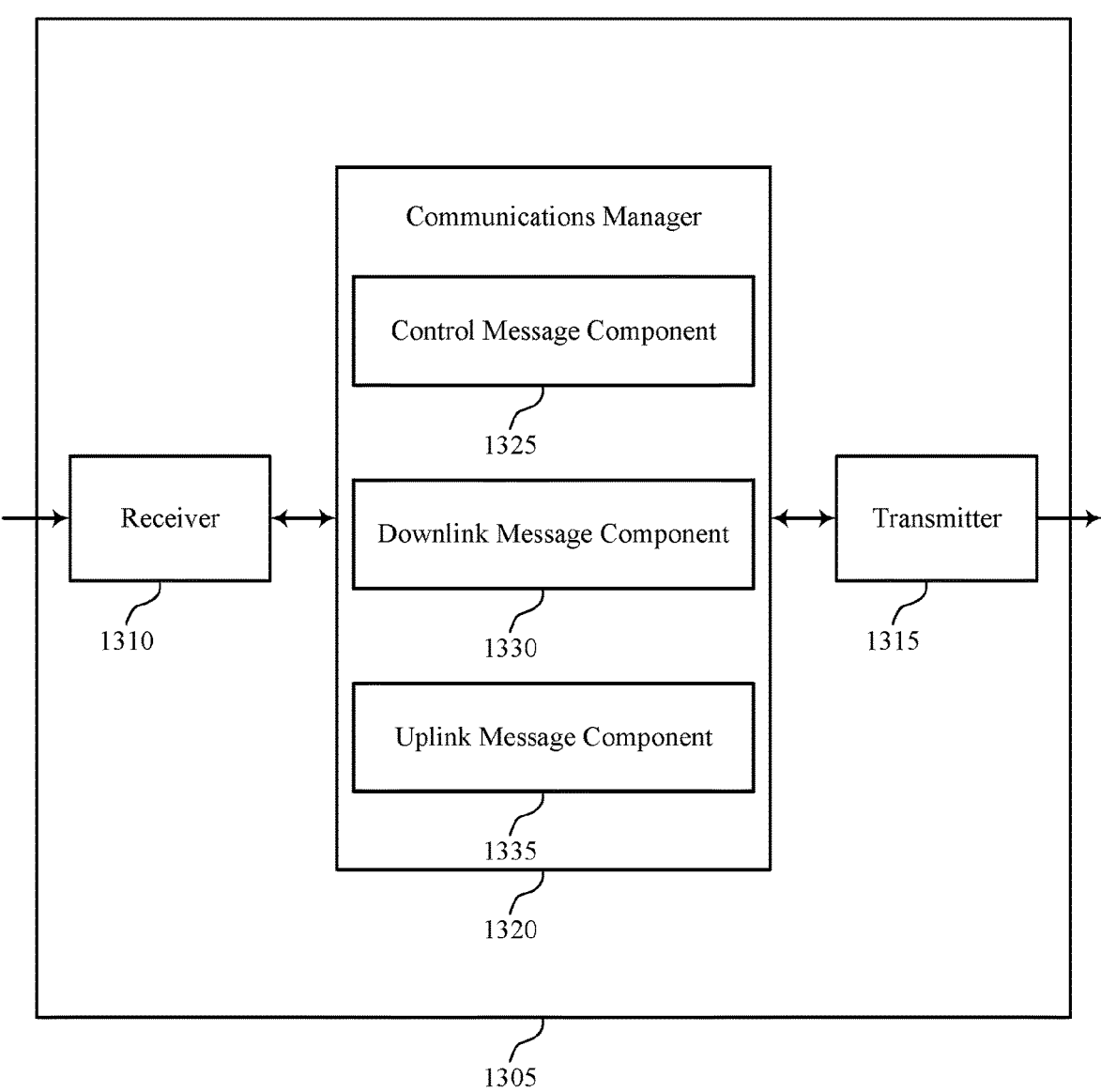

FIG. 13 shows a block diagram 1300 of a device 1305 that supports frequency-selective uplink precoding in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to frequency-selective uplink precoding). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to frequency-selective uplink precoding). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of frequency-selective uplink precoding as described herein. For example, the communications manager 1320 may include a control message component 1325, a downlink message component 1330, an uplink message component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The control message component 1325 may be configured as or otherwise support a means for transmitting, to a UE, a first control message indicating a set of downlink resources for a downlink message associated with subband uplink precoding information for the UE. The control message component 1325 may be configured as or otherwise support a means for transmitting, to the UE, a second control message associated with the downlink message and indicating a set of uplink resources for an uplink message, where the downlink message, the second control message, or any combination thereof includes the subband uplink precoding information for the UE. The downlink message component 1330 may be configured as or otherwise support a means for transmitting, to the UE, the downlink message via the set of downlink resources indicated by the first control message. The uplink message component 1335 may be configured as or otherwise support a means for receiving, from the UE via the set of uplink resources indicated by the second control message, the uplink message in accordance with the subband uplink precoding information.

Figure 14:
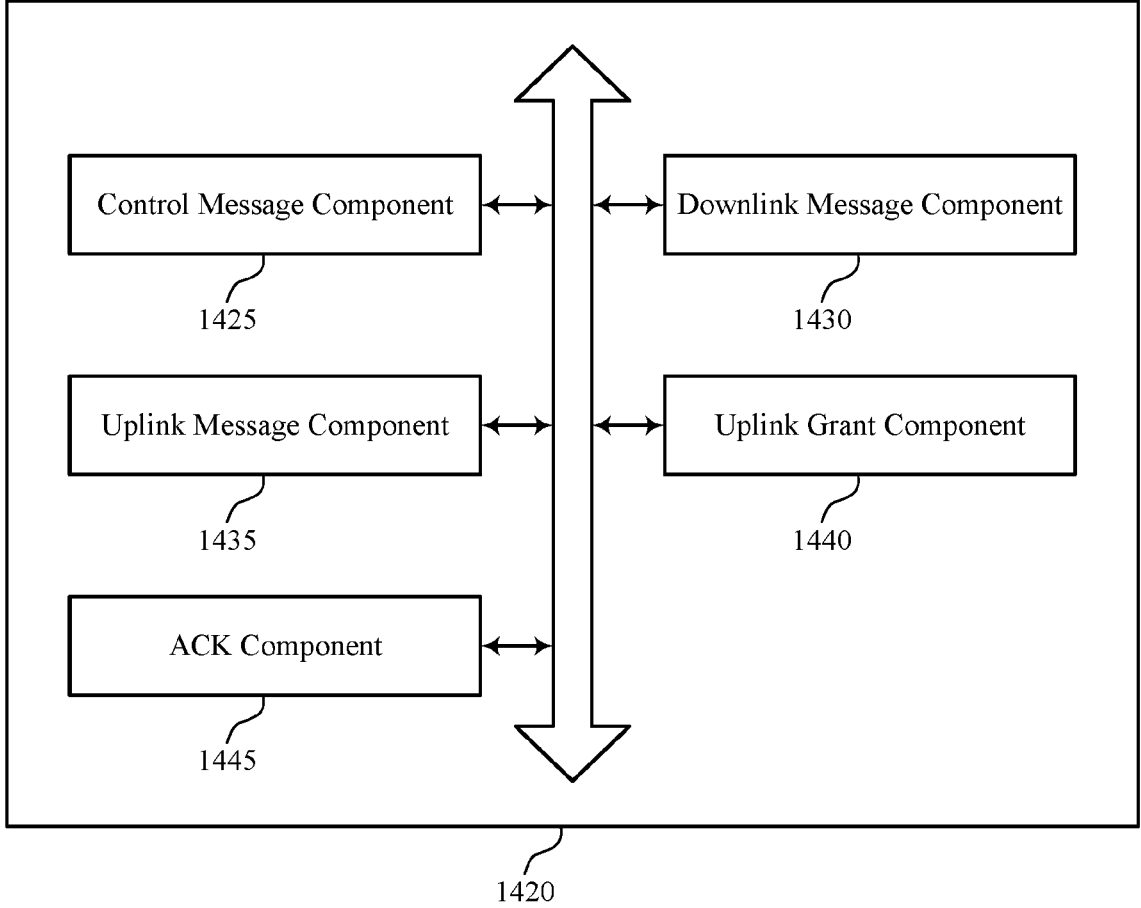
FIG. 14 shows a block diagram of a communications manager that supports frequency-selective uplink precoding in accordance with aspects of the present disclosure.

FIG. 14 shows a block diagram 1400 of a communications manager 1420 that supports frequency-selective uplink precoding in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of frequency-selective uplink precoding as described herein. For example, the communications manager 1420 may include a control message component 1425, a downlink message component 1430, an uplink message component 1435, an uplink grant component 1440, an ACK component 1445, or any combination thereof. Each of these components may communicate, directly or indirectly, with one another (e.g., via one or more buses).

The communications manager 1420 may support wireless communication at a base station in accordance with examples as disclosed herein. The control message component 1425 may be configured as or otherwise support a means for transmitting, to a UE, a first control message indicating a set of downlink resources for a downlink message associated with subband uplink precoding information for the UE. In some examples, the control message component 1425 may be configured as or otherwise support a means for transmitting, to the UE, a second control message associated with the downlink message and indicating a set of uplink resources for an uplink message, where the downlink message, the second control message, or any combination thereof includes the subband uplink precoding information for the UE. The downlink message component

1430 may be configured as or otherwise support a means for transmitting, to the UE, the downlink message via the set of downlink resources indicated by the first control message. The uplink message component 1435 may be configured as or otherwise support a means for receiving, from the UE via the set of uplink resources indicated by the second control message, the uplink message in accordance with the subband uplink precoding information.

In some examples, the downlink message component 1430 may be configured as or otherwise support a means for transmitting, to the UE, a set of one or more downlink messages including at least the downlink message. In some examples, each downlink message of the set of one or more downlink messages indicates a respective set of subband uplink precoding options for the UE. In some examples, the second control message indicates, from among the respective set of subband uplink precoding options included in the downlink message, a subband uplink precoding option corresponding to the subband uplink precoding information for the UE.

In some examples, each subband uplink precoding option of the respective set of subband uplink precoding options included in the downlink message corresponds to a different single-user or multi-user pairing scenario for the UE.

In some examples, the second control message includes a field for which a first set of values each correspond to a different wideband uplink precoding option for the UE and a second set of values each correspond to a different subband uplink precoding option of the respective set of subband uplink precoding options. In some examples, to indicate the subband uplink precoding option from among the respective set of subband uplink precoding options included in the downlink message, the field has a value that is included in the second set of values and corresponds to the subband uplink precoding option.

In some examples, the second control message includes a first indication of a value and a second indication of whether the value corresponds to a respective wideband uplink precoding option for the UE or corresponds to a respective subband uplink precoding option of the respective set of subband uplink precoding options. In some examples, to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

In some examples, the second control message includes a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based on the first field or the UE is to use subband uplink precoding based on the second field. In some examples, to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

In some examples, the downlink message component 1430 may be configured as or otherwise support a means for transmitting, to the UE, a MAC-CE, the MAC-CE including the downlink message. In some examples, the ACK component 1445 may be configured as or otherwise support a means for receiving, from the UE, an ACK message in response to the MAC-CE. In some examples, the second control message may include an uplink grant that indicates the MAC-CE based on the MAC-CE being a most recent MAC-CE acknowledged by the UE.

In some examples, transmitting the downlink message includes transmitting a downlink shared channel transmission via the set of downlink resources. In some examples, the first control message includes DCI that schedules the downlink shared channel transmission. In some examples, transmitting the second control message includes transmitting a MAC-CE associated with the downlink shared channel transmission, the MAC-CE including an uplink grant that indicates uplink resources for the uplink message and indicates the subband uplink precoding information for the UE.

Figure 15:
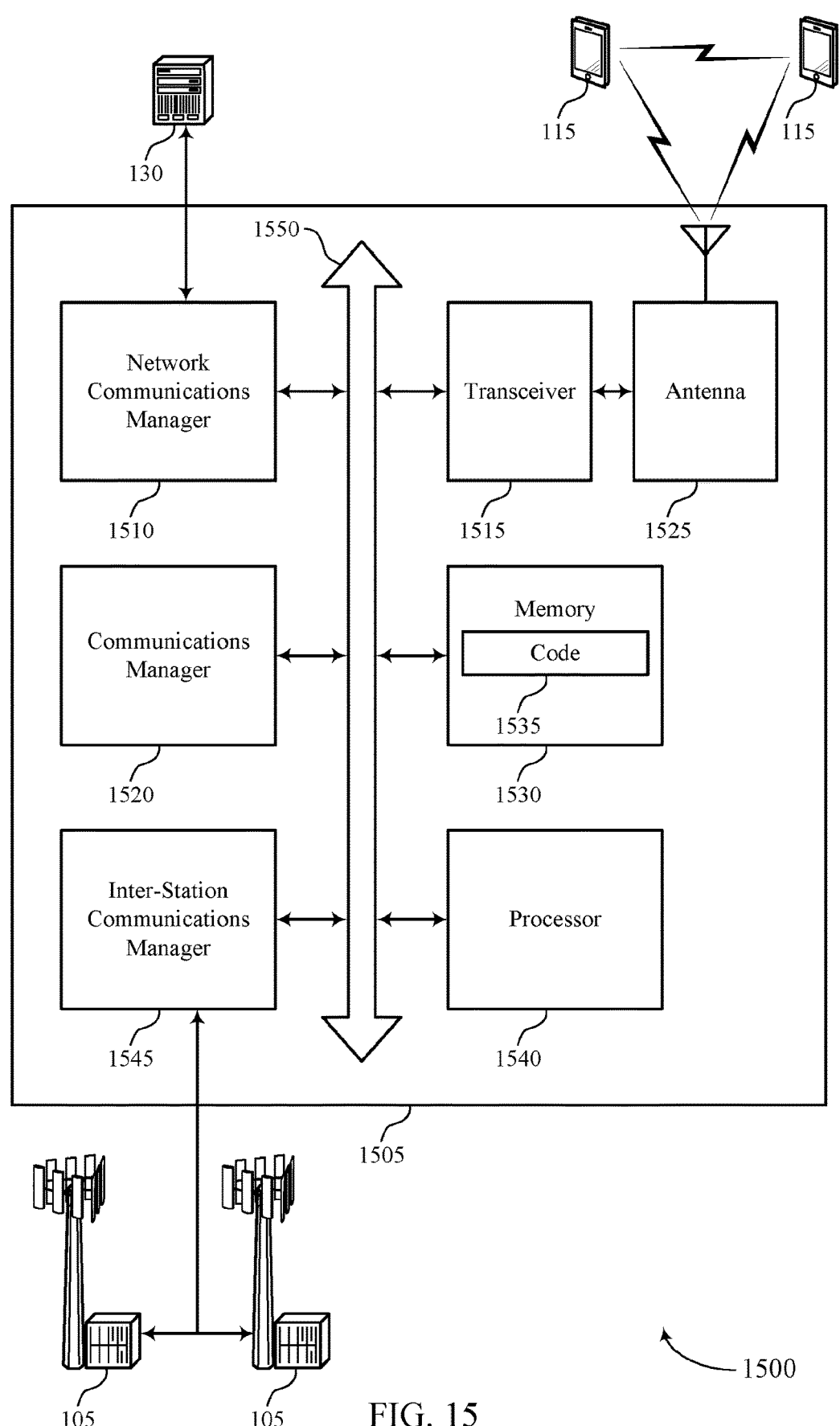
FIG. 15 shows a diagram of a system including a device that supports frequency-selective uplink precoding in accordance with aspects of the present disclosure.

FIG. 15 shows a diagram of a system 1500 including a device 1505 that supports frequency-selective uplink precoding in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting fre- quency-selective uplink precoding). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling com- munications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communi- cation between base stations 105.

The communications manager 1520 may support wireless communication at a base station in accordance with examples as disclosed herein. For example, the communi- cations manager 1520 may be configured as or otherwise support a means for transmitting, to a UE, a first control message indicating a set of downlink resources for a down- link message associated with subband uplink precoding information for the UE. The communications manager 1520 may be configured as or otherwise support a means for transmitting, to the UE, a second control message associated with the downlink message and indicating a set of uplink resources for an uplink message, where the downlink mes- sage, the second control message, or any combination thereof includes the subband uplink precoding information for the UE. The communications manager 1520 may be configured as or otherwise support a means for transmitting, to the UE, the downlink message via the set of downlink resources indicated by the first control message. The com- munications manager 1520 may be configured as or other- wise support a means for receiving, from the UE via the set of uplink resources indicated by the second control message, the uplink message in accordance with the subband uplink precoding information.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instruc- tions executable by the processor 1540 to cause the device 1505 to perform various aspects of frequency-selective uplink precoding as described herein, or the processor 1540 and the memory 1530 may be otherwise configured to perform or support such operations.

FIG. 16 shows a flowchart illustrating a method 1600 that supports frequency-selective uplink precoding in accor- dance with aspects of the present disclosure. The operations of the method 1600 may be implemented by a UE or its components as described herein. For example, the opera- tions of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a first control message indicating a set of downlink resources for a down- link message associated with subband uplink precoding information for the UE. The operations of 1605 may be performed in accordance with examples as disclosed herein. In some examples, aspects of the operations of 1605 may be performed by a control message component 1025 as described with reference to FIG. 10.

At 1610, the method may include receiving a second control message associated with the downlink message and indicating a set of uplink resources for an uplink message, where the downlink message, the second control message, or any combination thereof includes the subband uplink pre- coding information for the UE. The operations of 1610 may be performed in accordance with examples as disclosed herein. In some examples, aspects of the operations of 1610 may be performed by a control message component 1025 as described with reference to FIG. 10.

At 1615, the method may include receiving the downlink message via the set of downlink resources indicated by the first control message. The operations of 1615 may be performed in accordance with examples as disclosed herein. In some examples, aspects of the operations of 1615 may be performed by a downlink message component 1030 as described with reference to FIG. 10.

At 1620, the method may include transmitting, via the set of uplink resources indicated by the second control message, the uplink message in accordance with the subband uplink precoding information. The operations of 1620 may be performed in accordance with examples as disclosed herein. In some examples, aspects of the operations of 1620 may be performed by an uplink message component 1035 as described with reference to FIG. 10.

FIG. 17 shows a flowchart illustrating a method 1700 that supports frequency-selective uplink precoding in accor- dance with aspects of the present disclosure. The operations of the method 1700 may be implemented by a UE or its components as described herein. For example, the opera- tions of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a first control message indicating a set of downlink resources for a downlink message associated with subband uplink precoding information for the UE. The operations of 1705 may be performed in accordance with examples as disclosed herein. In some examples, aspects of the operations of 1705 may be performed by a control message component 1025 as described with reference to FIG. 10.

At 1710, the method may include receiving a second control message associated with the downlink message and indicating a set of uplink resources for an uplink message, where the downlink message, the second control message, or any combination thereof comprises the subband uplink precoding information for the UE, and where the second control message comprises an uplink grant that indicates the set of uplink resources for transmitting the uplink message and enables communications based at least in part on subband-specific precoding for the uplink message. The operations of 1710 may be performed in accordance with examples as disclosed herein. In some examples, aspects of the operations of 1710 may be performed by a control message component 1025 as described with reference to FIG. 10.

At 1715, the method may include receiving the downlink message via the set of downlink resources indicated by the first control message and based on the uplink grant. The operations of 1715 may be performed in accordance with examples as disclosed herein. In some examples, aspects of the operations of 1715 may be performed by a downlink message component 1030 as described with reference to FIG. 10.

At 1720, the method may include transmitting, via the set of uplink resources indicated by the second control message, the uplink message in accordance with the subband uplink precoding information. The operations of 1720 may be performed in accordance with examples as disclosed herein. In some examples, aspects of the operations of 1720 may be performed by an uplink message component 1035 as described with reference to FIG. 10.

FIG. 18 shows a flowchart illustrating a method 1800 that supports frequency-selective uplink precoding in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving a first control message indicating a set of downlink resources for a downlink message associated with subband uplink precoding information for the UE. The operations of 1805 may be performed in accordance with examples as disclosed herein. In some examples, aspects of the operations of 1805 may be performed by a control message component 1025 as described with reference to FIG. 10.

At 1810, the method may include receiving a second control message associated with the downlink message and indicating a set of uplink resources for an uplink message, where the downlink message, the second control message, or any combination thereof includes the subband uplink precoding information for the UE. The operations of 1810 may be performed in accordance with examples as disclosed herein. In some examples, aspects of the operations of 1810 may be performed by a control message component 1025 as described with reference to FIG. 10.

At 1815, the method may include receiving a third control message that allocates a second set of downlink resources for a downlink control channel associated with the UE. The operations of 1815 may be performed in accordance with examples as disclosed herein. In some examples, aspects of the operations of 1815 may be performed by a control message component 1025 as described with reference to FIG. 10.

At 1820, the method may include the downlink message via the downlink control channel associated with the UE and via the set of downlink resources based at least in part on the first control message and the third control message. The operations of 1820 may be performed in accordance with examples as disclosed herein. In some examples, aspects of the operations of 1820 may be performed by a downlink message component 1030 as described with reference to FIG. 10.

At 1825, the method may include transmitting, via the set of uplink resources indicated by the second control message, the uplink message in accordance with the subband uplink precoding information. The operations of 1825 may be performed in accordance with examples as disclosed herein. In some examples, aspects of the operations of 1825 may be performed by an uplink message component 1035 as described with reference to FIG. 10.

FIG. 19 shows a flowchart illustrating a method 1900 that supports frequency-selective uplink precoding in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a first control message indicating a set of downlink resources for a downlink message associated with subband uplink precoding information for the UE. The operations of 1905 may be performed in accordance with examples as disclosed herein. In some examples, aspects of the operations of 1905 may be performed by a control message component 1425 as described with reference to FIG. 14.

At 1910, the method may include transmitting, to the UE, a second control message associated with the downlink message and indicating a set of uplink resources for an uplink message, where the downlink message, the second control message, or any combination thereof includes the subband uplink precoding information for the UE. The operations of 1910 may be performed in accordance with examples as disclosed herein. In some examples, aspects of the operations of 1910 may be performed by a control message component 1425 as described with reference to FIG. 14.

At 1915, the method may include transmitting, to the UE, the downlink message via the set of downlink resources indicated by the first control message. The operations of 1915 may be performed in accordance with examples as disclosed herein. In some examples, aspects of the operations of 1915 may be performed by a downlink message component 1430 as described with reference to FIG. 14.

At 1920, the method may include receiving, from the UE via the set of uplink resources indicated by the second control message, the uplink message in accordance with the subband uplink precoding information. The operations of 1920 may be performed in accordance with examples as disclosed herein. In some examples, aspects of the operations of 1920 may be performed by an uplink message component 1435 as described with reference to FIG. 14.

FIG. 20 shows a flowchart illustrating a method 2000 that supports frequency-selective uplink precoding in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a first control message indicating a set of downlink resources for a downlink message associated with subband uplink precoding information for the UE. The operations of 2005 may be performed in accordance with examples as disclosed herein. In some examples, aspects of the operations of 2005 may be performed by a control message component 1425 as described with reference to FIG. 14.

At 2010, the method may include transmitting, to the UE, a second control message associated with the downlink message and indicating a set of uplink resources for an uplink message, where the downlink message, the second control message, or any combination thereof includes the subband uplink precoding information for the UE. The operations of 2010 may be performed in accordance with examples as disclosed herein. In some examples, aspects of the operations of 2010 may be performed by a control message component 1425 as described with reference to FIG. 14.

At 2015, the method may include transmitting, to the UE, a set of one or more downlink messages comprising at least the downlink message via the set of downlink resources indicated by the first control message, where each downlink message of the set of one or more downlink messages indicates a respective set of subband uplink precoding options for the UE, and where the second control message indicates, from among the respective set of subband uplink precoding options included in the downlink message, a subband uplink precoding option corresponding to the subband uplink precoding information for the UE. The operations of 2015 may be performed in accordance with examples as disclosed herein. In some examples, aspects of the operations of 2015 may be performed by a downlink message component 1430 as described with reference to FIG. 14.

At 2020, the method may include receiving, from the UE via the set of uplink resources indicated by the second control message, the uplink message in accordance with the subband uplink precoding information. The operations of 2020 may be performed in accordance with examples as disclosed herein. In some examples, aspects of the operations of 2020 may be performed by an uplink message component 1435 as described with reference to FIG. 14.

The following provides an overview of aspects of the present disclosure:

Aspect 1: A method for wireless communication at a UE, comprising: receiving a first control message indicating a set of downlink resources for a downlink message associated with subband uplink precoding information for the UE; receiving a second control message associated with the downlink message and indicating a set of uplink resources for an uplink message, wherein the downlink message, the second control message, or any combination thereof comprises the subband uplink precoding information for the UE; receiving the downlink message via the set of downlink resources indicated by the first control message; and transmitting, via the set of uplink resources indicated by the second control message, the uplink message in accordance with the subband uplink precoding information.

Aspect 2: The method of aspect 1, further comprising: receiving a set of one or more downlink messages comprising at least the downlink message, wherein: each downlink message of the set of one or more downlink messages indicates a respective set of subband uplink precoding options for the UE; and the second control message indicates, from among the respective set of subband uplink precoding options included in the downlink message, a subband uplink precoding option corresponding to the subband uplink precoding information for the UE.

Aspect 3: The method of aspect 2, wherein each subband uplink precoding option of the respective set of subband uplink precoding options included in the downlink message corresponds to a different single-user or multi-user pairing scenario for the UE.

Aspect 4: The method of any of aspects 2 through 3, wherein the first control message indicates a maximum quantity of subband uplink precoding options for each respective set of subband uplink precoding options, one or more sets of downlink resources for receiving the set of one or more downlink messages, a codebook type for the subband uplink precoding information, a codebook mode for the subband uplink precoding information, or any combination thereof.

Aspect 5: The method of any of aspects 2 through 4, wherein each subband uplink precoding option of the respective set of subband uplink precoding options included in the downlink message comprises respective subband PMI information and respective RI information for the UE or for a set of UEs that comprises the UE.

Aspect 6: The method of any of aspects 2 through 5, further comprising: receiving RRC signaling indicating a periodicity associated with the set of one or more downlink messages, wherein the RRC signaling comprises the first control message; and receiving the set of one or more downlink messages in accordance with the periodicity.

Aspect 7: The method of any of aspects 2 through 5, further comprising: receiving DCI that schedules each downlink message of the set of one or more downlink messages; and receiving the set of one or more downlink messages in an aperiodic or semi-persistent manner in accordance with the DCI.

Aspect 8: The method of any of aspects 2 through 7, wherein: the second control message comprises a field for which a first set of values each correspond to a different wideband uplink precoding option for the UE and a second set of values each correspond to a different subband uplink precoding option of the respective set of subband uplink precoding options; and to indicate the subband uplink precoding option from among the respective set of subband uplink precoding options included in the downlink message, the field has a value that is included in the second set of values and corresponds to the subband uplink precoding option.

Aspect 9: The method of any of aspects 2 through 7, wherein: the second control message comprises a first indication of a value and a second indication of whether the value corresponds to a respective wideband uplink precoding option for the UE or corresponds to a respective subband uplink precoding option of the respective set of subband uplink precoding options; and to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

Aspect 10: The method of any of aspects 2 through 7, wherein: the second control message comprises a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based at least in part on the first field or the UE is to use subband uplink precoding based at least in part on the second field; and to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

Aspect 11: The method of any of aspects 2 through 10, wherein receiving the second control message comprises: receiving an uplink grant that indicates the set of uplink resources for transmitting the uplink message.

Aspect 12: The method of any of aspects 1 through 11, wherein receiving the second control message comprises: receiving, via the second control message, an uplink grant that indicates the set of uplink resources for transmitting the uplink message and enables communications based at least in part on subband-specific precoding for the uplink message; and receiving the downlink message based at least in part on the uplink grant.

Aspect 13: The method of aspect 12, further comprising: receiving a second uplink grant that disables communications based at least in part on the subband-specific precoding and indicates a second set of uplink resources for transmitting a second uplink message, the second uplink grant comprising wideband precoding information for the second uplink message; and transmitting the second uplink message in accordance with the wideband precoding information and via the second set of uplink resources indicated by the second uplink grant.

Aspect 14: The method of any of aspects 1 through 13, wherein receiving the downlink message comprises: receiving the downlink message via a downlink shared channel.

Aspect 15: The method of any of aspects 1 through 13, further comprising: receiving a third control message that allocates a second set of downlink resources for a downlink control channel associated with the UE; and receiving the downlink message via the downlink control channel associated with the UE based at least in part on the third control message.

Aspect 16: The method of any of aspects 1 through 13, wherein receiving the downlink message comprises: receiving a MAC-CE.

Aspect 17: The method of aspect 16, further comprising: transmitting an ACK message in response to receiving the MAC-CE, wherein the second control message comprises an uplink grant that indicates the MAC-CE based at least in part on the MAC-CE being a most recent MAC-CE acknowledged by the UE.

Aspect 18: The method of aspect 1, wherein: receiving the downlink message comprises receiving a downlink shared channel transmission via the set of downlink resources; the first control message comprises DCI that schedules the downlink shared channel transmission; and receiving the second control message comprises receiving a MAC-CE associated with the downlink shared channel transmission, the MAC-CE comprising an uplink grant that indicates uplink resources for the uplink message and indicates the subband uplink precoding information for the UE.

Aspect 19: A method for wireless communication at a base station, comprising: transmitting, to a UE, a first control message indicating a set of downlink resources for a downlink message associated with subband uplink precoding information for the UE; transmitting, to the UE, a second control message associated with the downlink message and indicating a set of uplink resources for an uplink message, wherein the downlink message, the second control message, or any combination thereof comprises the subband uplink precoding information for the UE; transmitting, to the UE, the downlink message via the set of downlink resources indicated by the first control message; and receiving, from the UE via the set of uplink resources indicated by the second control message, the uplink message in accordance with the subband uplink precoding information.

Aspect 20: The method of aspect 19, further comprising: transmitting, to the UE, a set of one or more downlink messages comprising at least the downlink message, wherein: each downlink message of the set of one or more downlink messages indicates a respective set of subband uplink precoding options for the UE; and the second control message indicates, from among the respective set of subband uplink precoding options included in the downlink message, a subband uplink precoding option corresponding to the subband uplink precoding information for the UE.

Aspect 21: The method of aspect 20, wherein each subband uplink precoding option of the respective set of subband uplink precoding options included in the downlink message corresponds to a different single-user or multi-user pairing scenario for the UE.

Aspect 22: The method of any of aspects 20 through 21, wherein: the second control message comprises a field for which a first set of values each correspond to a different wideband uplink precoding option for the UE and a second set of values each correspond to a different subband uplink precoding option of the respective set of subband uplink precoding options; and to indicate the subband uplink precoding option from among the respective set of subband uplink precoding options included in the downlink message, the field has a value that is included in the second set of values and corresponds to the subband uplink precoding option.

Aspect 23: The method of any of aspects 20 through 21, wherein: the second control message comprises a first indication of a value and a second indication of whether the value corresponds to a respective wideband uplink precoding option for the UE or corresponds to a respective subband uplink precoding option of the respective set of subband uplink precoding options; and to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

Aspect 24: The method of any of aspects 20 through 21, wherein: the second control message comprises a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based at least in part on the first field or the UE is to use subband uplink precoding based at least in part on the second field; and to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

Aspect 25: The method of any of aspects 19 through 24, further comprising: transmitting, to the UE, a MAC-CE, the MAC-CE comprising the downlink message; receiving, from the UE, an ACK message in response to the MAC-CE; and transmitting the second control message comprising an uplink grant that indicates the MAC-CE based at least in part on the MAC-CE being a most recent MAC-CE acknowledged by the UE.

Aspect 26: The method of aspect 19, wherein: transmitting the downlink message comprises transmitting a downlink shared channel transmission via the set of downlink resources; the first control message comprises DCI that schedules the downlink shared channel transmission; and transmitting the second control message comprises transmitting a MAC-CE associated with the downlink shared channel transmission, the MAC-CE comprising an uplink grant that indicates uplink resources for the uplink message and indicates the subband uplink precoding information for the UE.

Aspect 27: An apparatus for wireless communication at a UE, comprising a processor; memory in electronic communication with the processor; and instructions stored in the memory, wherein the instructions are executable by the processor to perform a method of any of aspects 1 through 18.

Aspect 28: An apparatus for wireless communication at a UE, comprising at least one means for performing a method of any of aspects 1 through 18.

Aspect 29: A non-transitory computer-readable medium storing code for wireless communication at a UE, the code comprising instructions executable to perform a method of any of aspects 1 through 18.

Aspect 30: An apparatus for wireless communication at a base station, comprising a processor; memory in electronic communication with the processor; and instructions stored in the memory, wherein the instructions are executable by the processor to perform a method of any of aspects 19 through 26.

Aspect 31: An apparatus for wireless communication at a base station, comprising at least one means for performing a method of any of aspects 19 through 26.

Aspect 32: A non-transitory computer-readable medium storing code for wireless communication at a base station, the code comprising instructions executable to perform a method of any of aspects 19 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a first control message indicating a set of downlink resources for a downlink message associated with subband uplink precoding information for the UE;

receiving a second control message associated with the downlink message and indicating a set of uplink resources for an uplink message, wherein the downlink message, the second control message, or any combination thereof comprises the subband uplink precoding information for the UE;

receiving the downlink message via the set of downlink resources indicated by the first control message;

transmitting, via the set of uplink resources indicated by the second control message, the uplink message in accordance with the subband uplink precoding information;

receiving a set of one or more downlink messages comprising at least the downlink message, wherein:

each downlink message of the set of one or more downlink messages indicates a respective set of subband uplink precoding options for the UE;

the second control message indicates, from among the respective set of subband uplink precoding options included in the downlink message, a subband uplink precoding option corresponding to the subband uplink precoding information for the UE; and wherein each subband uplink precoding option of the respective set of subband uplink precoding options included in the downlink message corresponds to a different single-user or multi-user pairing scenario for the UE.

2. The method of claim 1, wherein the first control message indicates a maximum quantity of subband uplink precoding options for each respective set of subband uplink precoding options, one or more sets of downlink resources for receiving the set of one or more downlink messages, a codebook type for the subband uplink precoding information, a codebook mode for the subband uplink precoding information, or any combination thereof.

3. The method of claim 1, wherein each subband uplink precoding option of the respective set of subband uplink precoding options included in the downlink message comprises respective subband precoding matrix indicator information and respective rank indicator information for the UE or for a set of UEs that comprises the UE.

4. The method of claim 1, further comprising:

receiving radio resource control signaling indicating a periodicity associated with the set of one or more downlink messages, wherein the radio resource control signaling comprises the first control message; and receiving the set of one or more downlink messages in accordance with the periodicity.

5. The method of claim 1, further comprising:

receiving downlink control information that schedules each downlink message of the set of one or more downlink messages; and receiving the set of one or more downlink messages in an aperiodic or semi-persistent manner in accordance with the downlink control information.

6. The method of claim 1, wherein:

the second control message comprises a field for which a first set of values each correspond to a different wideband uplink precoding option for the UE and a second set of values each correspond to a different subband uplink precoding option of the respective set of subband uplink precoding options; and to indicate the subband uplink precoding option from among the respective set of subband uplink precoding options included in the downlink message, the field has a value that is included in the second set of values and corresponds to the subband uplink precoding option.

7. The method of claim 1, wherein:

the second control message comprises a first indication of a value and a second indication of whether the value corresponds to a respective wideband uplink precoding option for the UE or corresponds to a respective subband uplink precoding option of the respective set of subband uplink precoding options; and to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

8. The method of claim 1, wherein:

the second control message comprises a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based at least in part on the first field or the UE is to use subband uplink precoding based at least in part on the second field; and to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

9. The method of claim 1, wherein receiving the second control message comprises:

receiving an uplink grant that indicates the set of uplink resources for transmitting the uplink message.

10. The method of claim 1, wherein receiving the second control message comprises:

receiving, via the second control message, an uplink grant that indicates the set of uplink resources for transmitting the uplink message and enables communications based at least in part on subband-specific precoding for the uplink message; and receiving the downlink message based at least in part on the uplink grant.

11. The method of claim 10, further comprising:

receiving a second uplink grant that disables communications based at least in part on the subband-specific precoding and indicates a second set of uplink resources for transmitting a second uplink message, the second uplink grant comprising wideband precoding information for the second uplink message; and transmitting the second uplink message in accordance with the wideband precoding information and via the second set of uplink resources indicated by the second uplink grant.

12. The method of claim 1, wherein receiving the downlink message comprises:

receiving the downlink message via a downlink shared channel.

13. The method of claim 1, further comprising:

receiving a third control message that allocates a second set of downlink resources for a downlink control channel associated with the UE; and receiving the downlink message via the downlink control channel associated with the UE based at least in part on the third control message.

14. The method of claim 1, wherein receiving the downlink message comprises:

receiving a medium access control-control element.

15. The method of claim 14, further comprising:

transmitting an acknowledgment message in response to receiving the medium access control-control element, wherein the second control message comprises an uplink grant that indicates the medium access control-control element based at least in part on the medium access control-control element being a most recent medium access control-control element acknowledged by the UE.

16. The method of claim 1, wherein:

receiving the downlink message comprises receiving a downlink shared channel transmission via the set of downlink resources;

the first control message comprises downlink control information that schedules the downlink shared channel transmission; and receiving the second control message comprises receiving a medium access control-control element associated with the downlink shared channel transmission, the medium access control-control element comprising an uplink grant that indicates uplink resources for the uplink message and indicates the subband uplink precoding information for the UE.

17. A method for wireless communications at a base station, comprising:

transmitting, to a user equipment (UE), a first control message indicating a set of downlink resources for a downlink message associated with subband uplink precoding information for the UE;

transmitting, to the UE, a second control message associated with the downlink message and indicating a set of uplink resources for an uplink message, wherein the downlink message, the second control message, or any combination thereof comprises the subband uplink precoding information for the UE;

transmitting, to the UE, the downlink message via the set of downlink resources indicated by the first control message;

receiving, from the UE via the set of uplink resources indicated by the second control message, the uplink message in accordance with the subband uplink precoding information; and transmitting, to the UE, a set of one or more downlink messages comprising at least the downlink message, wherein:

each downlink message of the set of one or more downlink messages indicates a respective set of subband uplink precoding options for the UE;

the second control message indicates, from among the respective set of subband uplink precoding options included in the downlink message, a subband uplink precoding option corresponding to the subband uplink precoding information for the UE; and wherein each subband uplink precoding option of the respective set of subband uplink precoding options included in the downlink message corresponds to a different single-user or multi-user pairing scenario for the UE.

18. The method of claim 17, wherein:

the second control message comprises a field for which a first set of values each correspond to a different wideband uplink precoding option for the UE and a second set of values each correspond to a different subband uplink precoding option of the respective set of subband uplink precoding options; and to indicate the subband uplink precoding option from among the respective set of subband uplink precoding options included in the downlink message, the field has a value that is included in the second set of values and corresponds to the subband uplink precoding option.

19. The method of claim 17, wherein:

the second control message comprises a first indication of a value and a second indication of whether the value corresponds to a respective wideband uplink precoding option for the UE or corresponds to a respective subband uplink precoding option of the respective set of subband uplink precoding options; and to indicate the subband uplink precoding option from among the respective set of subband uplink precoding options included in the downlink message, the second indication indicates that the value of the first indication corresponds to a respective subband uplink precoding option of the respective set of subband uplink precoding options, and the value of the first indication corresponds to the subband uplink precoding option.

20. The method of claim 17, wherein:

the second control message comprises a first field for which a first set of values each correspond to a different wideband uplink precoding option for the UE, a second field for which a second set of values each correspond to a different subband uplink precoding option of the respective set of subband uplink precoding options, and a third field that indicates whether the UE is to use wideband uplink precoding based at least in part on the first field or the UE is to use subband uplink precoding based at least in part on the second field; and to indicate the subband uplink precoding option from among the respective set of subband uplink precoding options included in the downlink message, the third field indicates that the UE is to use subband uplink precoding, and the second field has a value that is included in the second set of values and corresponds to the subband uplink precoding option.

21. The method of claim 17, further comprising:

transmitting, to the UE, a medium access control-control element, the medium access control-control element comprising the downlink message; and receiving, from the UE, an acknowledgment message in response to the medium access control-control element, wherein the second control message comprises an uplink grant that indicates the medium access control-control element based at least in part on the medium access control-control element being a most recent medium access control-control element acknowledged by the UE.

22. The method of claim 17, wherein:

transmitting the downlink message comprises transmitting a downlink shared channel transmission via the set of downlink resources;

the first control message comprises downlink control information that schedules the downlink shared channel transmission; and transmitting the second control message comprises transmitting a medium access control-control element associated with the downlink shared channel transmission, the medium access control-control element comprising an uplink grant that indicates uplink resources for the uplink message and indicates the subband uplink precoding information for the UE.

23. An apparatus for wireless communications at a user equipment (UE), comprising:

a processor;

memory in electronic communication with the processor; and instructions stored in the memory, wherein the instructions are executable by the processor to:

receive a first control message indicating a set of downlink resources for a downlink message associated with subband uplink precoding information for the UE;

receive a second control message associated with the downlink message and indicating a set of uplink resources for an uplink message, wherein the downlink message, the second control message, or any combination thereof comprises the subband uplink precoding information for the UE;

receive the downlink message via the set of downlink resources indicated by the first control message;

transmit, via the set of uplink resources indicated by the second control message, the uplink message in accordance with the subband uplink precoding information;

receive a set of one or more downlink messages comprising at least the downlink message, wherein:

each downlink message of the set of one or more downlink messages indicates a respective set of subband uplink precoding options for the UE;

the second control message indicates, from among the respective set of subband uplink precoding options included in the downlink message, a subband uplink precoding option corresponding to the subband uplink precoding information for the UE; and wherein each subband uplink precoding option of the respective set of subband uplink precoding options included in the downlink message corresponds to a different single-user or multi-user pairing scenario for the UE.

24. The apparatus of claim 23, wherein the instructions are further executable by the processor to:

receive a set of one or more downlink messages comprising at least the downlink message, wherein:

each downlink message of the set of one or more downlink messages indicates a respective set of subband uplink precoding options for the UE; and the second control message indicates, from among the respective set of subband uplink precoding options included in the downlink message, a subband uplink precoding option corresponding to the subband uplink precoding information for the UE.

25. An apparatus for wireless communications at a base station, comprising:

a processor;

memory in electronic communication with the processor; and instructions stored in the memory, wherein the instructions are executable by the processor to:

transmit, to a user equipment (UE), a first control message indicating a set of downlink resources for a downlink message associated with subband uplink precoding information for the UE;

transmit, to the UE, a second control message associated with the downlink message and indicating a set of uplink resources for an uplink message, wherein the downlink message, the second control message, or any combination thereof comprises the subband uplink precoding information for the UE;

transmit, to the UE, the downlink message via the set of downlink resources indicated by the first control message;

receive, from the UE via the set of uplink resources indicated by the second control message, the uplink message in accordance with the subband uplink precoding information;

transmit, to the UE, a set of one or more downlink messages comprising at least the downlink message, wherein:

each downlink message of the set of one or more downlink messages indicates a respective set of subband uplink precoding options for the UE;

the second control message indicates, from among the respective set of subband uplink precoding options included in the downlink message, a subband uplink precoding option corresponding to the subband uplink precoding information for the UE; and wherein each subband uplink precoding option of the respective set of subband uplink precoding options included in the downlink message corresponds to a different single-user or multi-user pairing scenario for the UE.

26. The apparatus of claim 25, wherein the instructions are further executable by the processor to:

transmit, to the UE, a set of one or more downlink messages comprising at least the downlink message, wherein:

each downlink message of the set of one or more downlink messages indicates a respective set of subband uplink precoding options for the UE; and the second control message indicates, from among the respective set of subband uplink precoding options included in the downlink message, a subband uplink precoding option corresponding to the subband uplink precoding information for the UE.

* * * * *